United States Patent
Iwama et al.

(10) Patent No.: US 7,272,134 B2
(45) Date of Patent: Sep. 18, 2007

(54) INTERNET TELEPHONE CONNECTION METHOD, BANDWIDTH CONTROLLER AND GATE KEEPER

(75) Inventors: Etsuko Iwama, Yokohama (JP); Tomohide Sugimoto, Fujisawa (JP); Ryogo Honda, Fujisawa (JP); Kansuke Kuroyanagi, Yokohama (JP); Yuichi Mori, Fujisawa (JP)

(73) Assignee: Hitachi, Ltd. (JP)

( * ) Notice: Subject to any disclaimer, the term of this patent is extended or adjusted under 35 U.S.C. 154(b) by 835 days.

(21) Appl. No.: 10/459,174

(22) Filed: Jun. 10, 2003

(65) Prior Publication Data
US 2003/0235187 A1 Dec. 25, 2003

Related U.S. Application Data

(62) Division of application No. 09/260,398, filed on Mar. 1, 1999, now Pat. No. 6,600,735.

(30) Foreign Application Priority Data

Jan. 29, 1999 (JP) .................................. 11-022287

(51) Int. Cl.
*H04L 12/66* (2006.01)
*H04L 12/28* (2006.01)
*H04N 3/16* (2006.01)

(52) U.S. Cl. ...................... 370/352; 370/389; 370/401; 370/468

(58) Field of Classification Search ................ 370/352, 370/389, 395.41, 395.21, 398, 395.31, 468, 370/351, 217, 218, 221, 225
See application file for complete search history.

(56) References Cited

U.S. PATENT DOCUMENTS

| | | | |
|---|---|---|---|
| 5,999,286 A | 12/1999 | Venkatesan | 359/117 |
| 6,000,735 A | 12/1999 | Jourdenais | 292/238 |
| 6,078,582 A | 6/2000 | Curry et al. | 370/356 |
| 6,108,337 A | 8/2000 | Sherman et al. | 370/401 |
| 6,144,661 A | 11/2000 | Katsube et al. | 370/400 |
| 6,151,304 A | 11/2000 | Doshi et al. | 370/238 |
| 6,157,648 A | 12/2000 | Voit et al. | 370/401 |

(Continued)

OTHER PUBLICATIONS

Japanese Office Action dated Nov. 9, 2004 with English translation.

(Continued)

*Primary Examiner*—Hanh Nguyen
(74) *Attorney, Agent, or Firm*—Sofer & Haroun, LLP

(57) ABSTRACT

In an Internet telephone connection method, a communication bandwidth is managed by using a bandwidth controller, gateway devices and voice relay routers to monitor communication quality under bandwidth reservation. A communication path under bandwidth reservation is preferentially selected by using gate keepers and the voice relay routers, and the connection of the Internet telephone is performed. A problematic device is prohibited from being selected as a connection-destination device at the time of a call setup and the problem restoration is monitored by using the gate keepers and the gateway devices. Further, a device having invalid attribute information is prohibited from being selected as a connection-destination device at the time of call-setup, and the restoration of the attribute information is notified to the overall network. Accordingly, the reservation of the communication bandwidth can be performed under the control of the overall network, fixed communication quality can be maintained and reliability can be enhanced.

11 Claims, 21 Drawing Sheets

U.S. PATENT DOCUMENTS

| | | | |
|---|---|---|---|
| 6,161,008 A | 12/2000 | Lee et al. | 455/414 |
| 6,163,536 A | 12/2000 | Dunn et al. | 370/352 |
| 6,167,042 A | 12/2000 | Garland et al. | 370/354 |
| 6,185,204 B1 | 2/2001 | Voit | 370/352 |
| 6,229,804 B1 | 5/2001 | Mortsolf et al. | 370/352 |
| 6,233,234 B1 | 5/2001 | Curry et al. | 370/356 |
| 6,360,267 B1 | 3/2002 | Kakiuchi et al. | 709/227 |
| 6,452,922 B1 * | 9/2002 | Ho | 370/352 |
| 6,456,617 B1 | 9/2002 | Oda et al. | 370/352 |
| 6,600,735 B1 | 7/2003 | Iwama et al. | 370/352 |
| 6,606,668 B1 * | 8/2003 | MeLampy et al. | 709/241 |
| 6,667,968 B1 * | 12/2003 | Tran | 370/352 |
| 6,888,803 B1 * | 5/2005 | Gentry et al. | 370/259 |

OTHER PUBLICATIONS

Nikkei Internet Technology Jul. 22, 1998 with English summary.
Visual Telephone Systems and Equipment for Local Area Networks Which Provide a Non-Guaranteed Quality of Service, ITU-T Recommendation H.323.
A Framework for a Gateway Location Protocal by Jonathan Rosenberg dated Jul. 7, 1998.

* cited by examiner

FIG. 7

DEVICE STATUS MANAGEMENT TABLE 1601

| GATE KEEPER NUMBER (1602) | DEVICE NUMBER (1603) | DEVICE STATUS (1604) |
|---|---|---|
| AAA | A | IN SERVICE |
| : | : | : |
| | Y | DATA INVALID |
| | Z | OUT OF SERVICE |
| : | : | : |

ATTRIBUTE MANAGEMENT TABLE 1605

| DEVICE NUMBER (1603) | DEVICE ADDRESS (1606) | PHONE PREFIX ALLOWED (1607) | VOICE CODING SPECIFICATION (1608) | PROTOCOL (1609) |
|---|---|---|---|---|
| A | AAAAAA | aaaaaaaaaaa | A1 | A2 |
| : | : | : | : | : |
| Z | ZZZZZZ | zzzzzzzzzzz | Z1 | Z2 |

BANDWIDTH RESERVATION CONDITION TABLE 1610

| DEVICE NUMBER (1603) | COUNTER PART DEVICE NUMBER (1611) | RESERVATION BANDWIDTH (1612) |
|---|---|---|
| A | B | 0 |
| : | : | : |
| Z | X | a |

BANDWIDTH RESERVATION SCHEDULE TABLE 1613

| TIME (1614) | DEVICE NUMBER (1603) | COUNTER PART DEVICE NUMBER (1611) | RESERVATION BANDWIDTH (1615) |
|---|---|---|---|
| 1 : 35 | C | D | 0 |
| | : | : | : |
| | F | C | b |
| 3 : 40 | S | K | c |
| | : | : | : |

1503

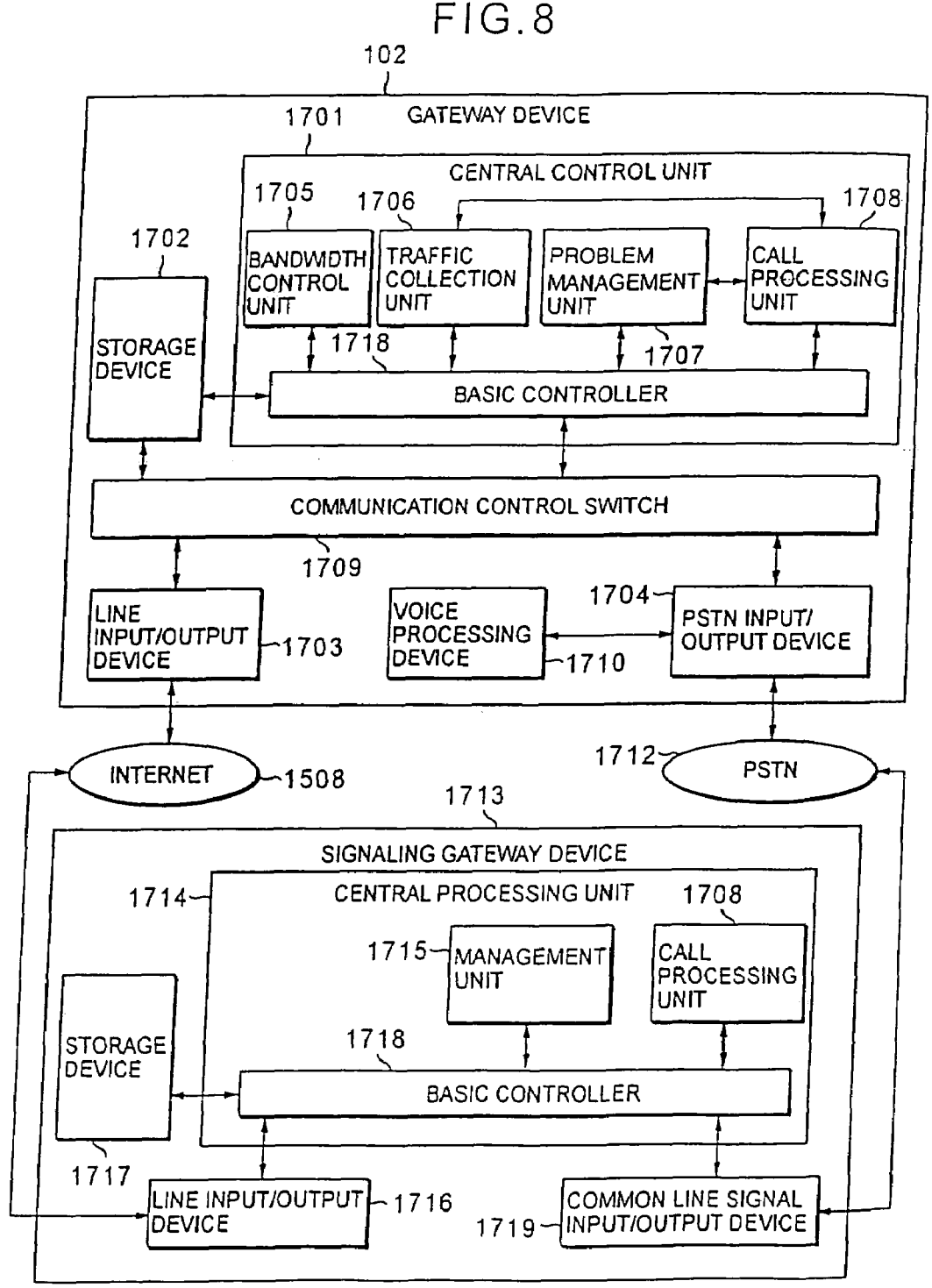

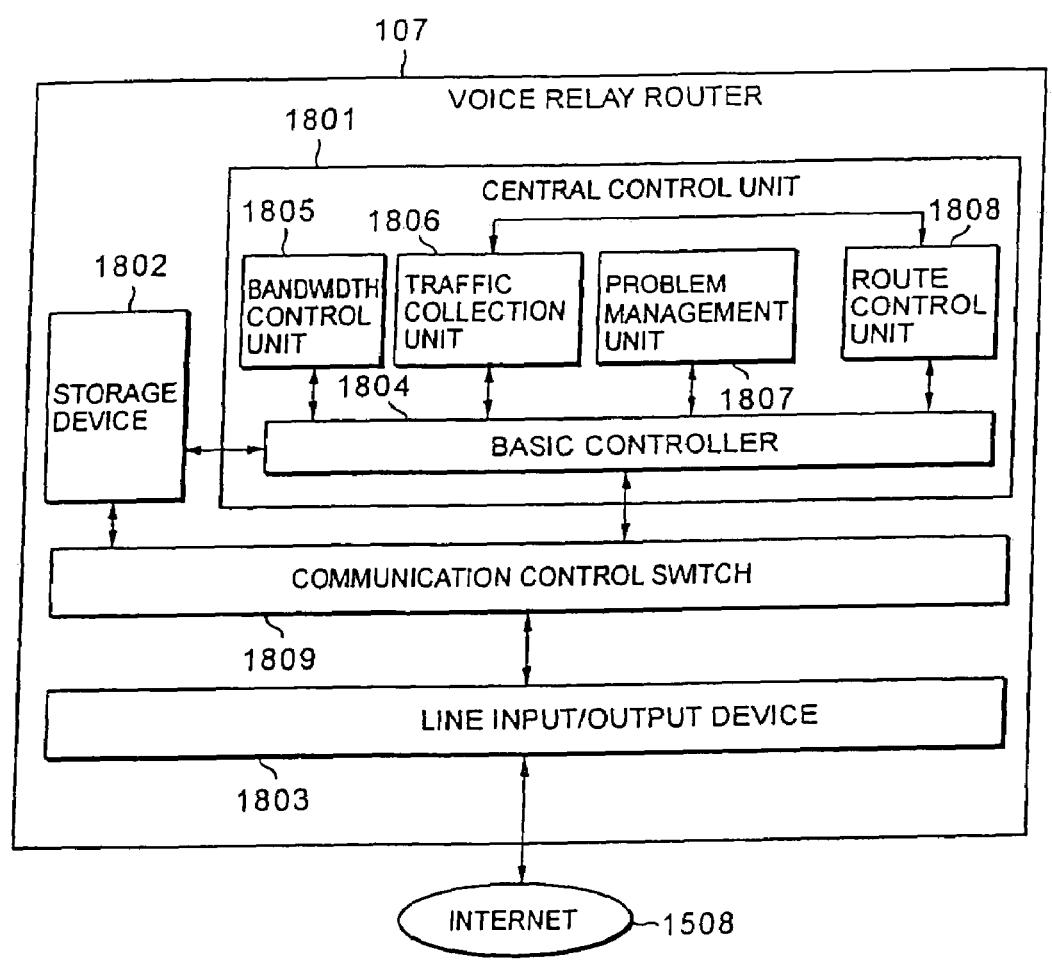

INTERNET TELEPHONE CONNECTION METHOD, BANDWIDTH CONTROLLER AND GATE KEEPER

This is a divisional patent application of U.S. patent application Ser. No. 09/260,398 filed on Mar. 1, 1999 now U.S. Pat. No. 6,600,735, the entirety of which is incorporated herein by reference.

BACKGROUND OF THE INVENTION

1. Field of the Invention

The present invention relates to an Internet telephone connection method for performing a call connection, etc. to a PSTN (public switched telephone network) through a gateway device for use in an Internet telephone system having a gateway device, a gate keeper, a bandwidth controller, and a router, etc.

2. Description of the Related Art

A method of implementing a protocol for servicing a telephone call from Internet to a PSTN is provided in Recommendation H.323 of ITU-T (International Telecommunication Union-Telecommunication Standardization Sector). In H.323, a gateway device for performing the interconnection processing between a PSTN and the Internet, and a gate keeper for managing/controlling plural gateway devices are used as main constituent elements. The gateway device performs conversion of a call control protocol and audio signals between the PSTN and the Internet. The gate keeper serves to manage the gateway devices in a zone under its control, and mainly performs selection of a connection destination gateway, authorization and admission control of a calling side, and allocation of a telephonic communication bandwidth in response to a call setup request from an IP (Internet Protocol) terminal or a gateway device.

In a case where a gateway device at a calling side (i.e., a call source), a gateway device at a called side (call destination) and a gate keeper are provided, the calling side gateway device which accepts a call reception from a PSTN assigns a connection condition such as the telephone number of a connection destination, etc. and inquires to the gate keeper. In response to this inquiry, the gate keeper determines the address of a called side gateway device which satisfies the request condition, and notifies it to the calling side gateway device. Subsequently, the calling side gateway device proceeds in the connection of the call to the called side gateway device. When a call setup is accepted between the gateway devices at the calling side and the called side, audio data are transmitted/received according to a protocol for transferring real-time data. In other words, the three-step procedures, that is, a procedure of determining the gateway device of a connection destination, a procedure of connecting a call to the gateway device thus determined and a procedure of transferring real-time information between the gateway devices thus connected are carried out for the call connection. The calling side gateway device may be designed in the form of an IP terminal having a telephone function.

Guidelines for the attribute information of the gateway device is specified in "a Framework for a Gateway Location Protocol" (IPTEL Working Group, Jul. 7, 1998) which has been considered by IETF (Internet Engineering Task Force). According to the guidelines, an assembly of gateway devices managed by the same gate keeper are defined as a zone, and it is assumed to extend to a form comprising plural zones. As the attribute information of the gateway device, there is provided the phone prefixes allowed, the address of a gateway device, the specification for voice coding, a signal protocol to be supported, a cost plan, a billing method, the confederation of membership, a total line capacity, an available line capacity, information concerning additive features supported, etc.

Here, the phone prefixes allowed represents an assembly of connectable telephone numbers when a connection is made from the gateway device thereof to a PSTN. Such attribute information is generally set in each gateway device by a maintainer or the like. In the following description, information causing a problem in connection such as a signal protocol supported by the phone prefixes allowed in the attribute information is referred to as "end-end attribute information".

The standardization of IETF aims to specify means for automatically registering the above attribute information into a gate keeper and means for informing the information to other gate keepers. With these means, when a new gateway device is connected to the Internet, the attribute information to be informed is automatically distributed to all the gate keepers which are mutually connected to one another using the protocol.

According to the model provided in IETF, there are assumed not only a case where only one gateway device is selected by the gate keeper, but also a case where a destination gateway device is selected from plural choices. Accordingly, if a gateway device at a calling side is aware of any problem/congestion condition or the like at a called side, a backup mechanism to enhance the reliability could be implemented. An available line capacity and an operation/stop state of the gateway device itself may be considered as the attribute information on the problem/congestion condition.

After a gateway device at a connection destination is selected and a pair of gateway devices are determined, a call connection is carried out according to the procedure of H.323. Whether a desired bandwidth can be secured between the gateway devices becomes clear after the protocol procedure after the connection proceeds. Therefore, if the Internet is in a congested condition, a desired quality of connection may not be provided. There is proposed a gateway device having a communication bandwidth reserving procedure such as RSVP (Resource Reservation Protocol) standardized in IETF, as described in Chapter 2 of "Delivering Voice over IP Networks" (written by D. Minoli, E. Minoli). The RSVP procedure is a procedure for reserving a one-way bandwidth from a called side to a calling side. According to this procedure, bandwidths are successively ensured via routers from the application at the called side to the application at the called side. In this case, reservations requesting the same bandwidth from both the sides are needed for voice traffic which needs a symmetrical bandwidth between upward and downward directions. If each application reserves a desired bandwidth with no limitation, a bandwidth-over event would occur and it is generally known that it is impossible to implement the perfect bandwidth guarantee in RSVP.

SUMMARY OF THE INVENTION

In the above conventional technique, when an IP terminal is connected to a PSTN through a gateway device, a communication bandwidth is allocated every time a call request occurs. Therefore, a total line capacity for call connection may not be ensured if the Internet is congested although there is an available communication line between the gateway device and the PSTN. Further, when a reservation procedure of reserving a communication bandwidth is used, the reservation of the optimum bandwidth in the overall network cannot be implemented because the gateway device has no means of ascertaining the bandwidth reservation status of the other gateway devices. In addition, since the perfect guarantee cannot be implemented even for reserved bandwidth, communication quality may not be ensured even when a call is setup on a reserved bandwidth. Still further, the telephone traffic amount and the data traffic amount vary with time, and thus the network resources could not be effectively used unless control based on prediction of load can be implemented.

A first object of the present invention is, in view of the above described problem, to ensure a fixed-quality communication bandwidth matched with a traffic demand between gateway devices in the Internet, enhance reliability and flexibly support variation of a traffic condition.

In the prior art, it is necessary to use a system of setting up a call for every request between gateway devices each having a relatively small traffic amount from the viewpoint of effective use of communication bandwidths of the network. When the connection is made according to the three-step procedure as described above, there is a case where a call connection to the gateway device of a connection destination selected in the first step does not succeed. This may be caused by some problem at some intermediate point in the route, some problem of the gateway device at the connection destination, impossibility of ensuring a guaranteed communication bandwidth due to congestion in the Internet, a line busy/trouble between the gateway device and the PSTN, etc. In order to perform services irrespective of the above problems with the Internet, it is necessary to provide plural gateway devices and set additional routes.

In the construction having additional routes, how to detect a problem and select an additional route is important. In a method of detecting the problem of a gateway device by a gate keeper and notifying it to each gate keeper in the Internet, it is necessary to transfer a lots of packets when the number of gateway devices and gate keepers is increased. Further, when another problem of the gate keeper itself occurs in addition to the above problems, the system itself does not function. In the Internet telephone system, there is a need for a certain manner in which when a connectability problem to a specific gateway device is detected, the gateway device concerned is automatically removed from the logic of selection and re-installed after restoration.

From the above viewpoint, a second object of the present invention aims to implement a high-reliability gateway device management system of detecting the connectability problem to a gateway device to select the optimum gateway device.

In the prior art, the attribute information registered in the gateway device is distributed to each gate keeper according to the protocol procedure. Here, when erroneous data are set in the end-end attribute information of the attribute information, the connectability problem occurs. For example, if there is any setting mistake in the phone prefix allowed, an incorrect gate device is selected and failure of call connection occurs frequently.

Further, the gate keeper distributes the attribute information of a gateway device to other gate keepers. When there is a failure in software in the gate keeper, erroneous data are informed into the network, resulting in causing the problem with respect to connectability in the overall network. In addition, when the gateway device updates the attribute information and informs new attribute information, the attribute information may not be informed to all the gate keepers due to a communication problem or the like.

From the foregoing viewpoint, a third object of the present invention aims to implement a robust Internet telephone service by implementing a logic in which when erroneous data are detected, the gateway device thereof is not selected until it is restored.

In order to attain the first object, according to the present invention, a bandwidth controller for managing reservation of a communication bandwidth with a gateway device at a called side is provided on the Internet. A voice relay router for relaying and transferring a voice packet is provided for an IP terminal. The bandwidth controller has a database in which a communication bandwidth to be reserved and ensured is registered on a time basis, and has a procedure of instructing a gateway device or a voice relay router to reserve a communication path using an indicated bandwidth at a predetermined time on the basis of the database. The gateway device or the voice relay router to which the bandwidth is reserved is provided with a procedure of checking connectability and communication quality periodically, and is also provided with a procedure of notifying deterioration in quality to the bandwidth controller when the communication quality is out of a predetermined range.

For the connection of a voice call, when there is a reserved bandwidth, the calling side gateway device sets up a call on the bandwidth concerned. The gate keeper is provided with means of notifying the address of the nearest voice relay router to an IP terminal when the calling side is the IP terminal. Upon accepting a telephone call from the IP terminal, the voice relay router sets up a call on the reserved bandwidth between it and the gateway device concerned.

In order to attain the second object, according to the present invention, there is provided means of informing a gate keeper of the fact that a called side gateway device has a problem in connectability and of a cause inducing the problem. Further, the gate keeper sets the gateway device having the connectability problem as being "out of service" on the database. Thereafter, if there is any substitute gateway device when the address of the gateway device at a connection destination is determined, the gate keeper excludes the gateway device being out of service from selection targets (i.e., makes the gateway device unselectable). The gate keeper has a testing function of periodically monitoring the connectability to gateway devices, and when the connectability to the gateway device being out of service is restored, it returns the "out of service" on the database to "in service". Further, the gate keeper notifies variation of the state of the gateway device to other gate keepers, and the gate keepers receiving the notification likewise sets "out of service" to monitor the gateway device concerned.

In order to attain the third object, according to the present invention, the gateway device is provided with means for notifying to the gate keeper information which may be erroneous data, and the gate keeper is provided with means for reading and checking the attribute information of the gateway device concerned, and means of setting the gateway device as being "inappropriate data" on the database and thus enforcing that it is not selected when the attribute information has an error. The database in the gate keeper is returned to the "in service" at the time when new attribute information of the gateway device concerned is notified. Further, the gate keeper notifies the "inappropriate data" of the gateway device to the other gate keepers. The gate keeper receiving this notification likewise sets the "inappropriate data" and excludes the gateway device concerned from the selection logic.

According to a first aspect of the present invention to attain the first object, in an Internet telephone connection method for use in the Internet, which includes gateway devices for mutually connecting a PSTN and the Internet, a gate keeper for managing the gateway devices in a zone and a bandwidth controller for managing the gate keeper in each zone, the gate keeper stores information on a communication bandwidth to be reserved into an internal storage device; the bandwidth controller extracts information on a communication bandwidth to be reserved from the gate keeper and instructs to make a reservation between the gateway device and a counter gateway device, cancel the reservation or alter the reservation content. The gateway device reserves a communication bandwidth between itself and the counter gateway device, wherein when a call request is made from a calling terminal in a PSTN to a called terminal in another PSTN, a calling side gateway device which is connected to the PSTN at the calling side notifies the telephone number of a call destination to the gate keeper to determine the corresponding called side gateway device, and the calling side and called side PSTNs and the Internet are connected via the Internet by using a communication bandwidth reserved between the calling side gateway device and the called side gateway device, thereby connecting the calling side terminal to the called side terminal.

According to a second aspect of the present invention to attain the second object, in the first aspect, when the connection to the gateway device notified from the gate keeper fails due to some problem, congestion or the like, the calling side gateway device notifies to the gate keeper that some problem has occurred in connectability of the called side gateway device, and the gate keeper determines another connectable gateway device when receiving from the calling side gateway device the notification indicating the failure of the connection to the called side gateway device, and stores the status of the called side gateway device as "out of service", and also notifies the "out of service" to other gate keepers.

According to a third aspect to the present invention to attain the third object, in the first aspect, the gate keeper requests the called side gateway device to notify the attribute information when the connection as requested cannot be established, compares the attribute information notified from the called side gateway device with the attribute information of the called side gateway device stored in the database thereof, sets the called side gateway device to a data invalid state on the database thereof and excludes the gateway device concerned from selection targets when the attribute information is erroneous, and notifies the invalid state to the other gate keepers.

BRIEF DESCRIPTION OF THE DRAWINGS

FIG. 7 is a diagram showing a table in a storage device belonging to a gate keeper according to the present invention;

FIG. 8 is a functional block diagram of a gateway device according to the present invention;

FIG. 9 is a functional block diagram of a voice relay router according to the present invention;

FIG. 18 is a diagram showing the system construction in which an Internet telephone service is provided when a device in the Internet is not usable due to a problem or the like;

DETAILED DESCRIPTION OF THE PREFERRED EMBODIMENTS

Preferred embodiments according to the present invention will be described hereunder with reference to the accompanying drawings.

(1) Internet Telephone System

Figure 1:
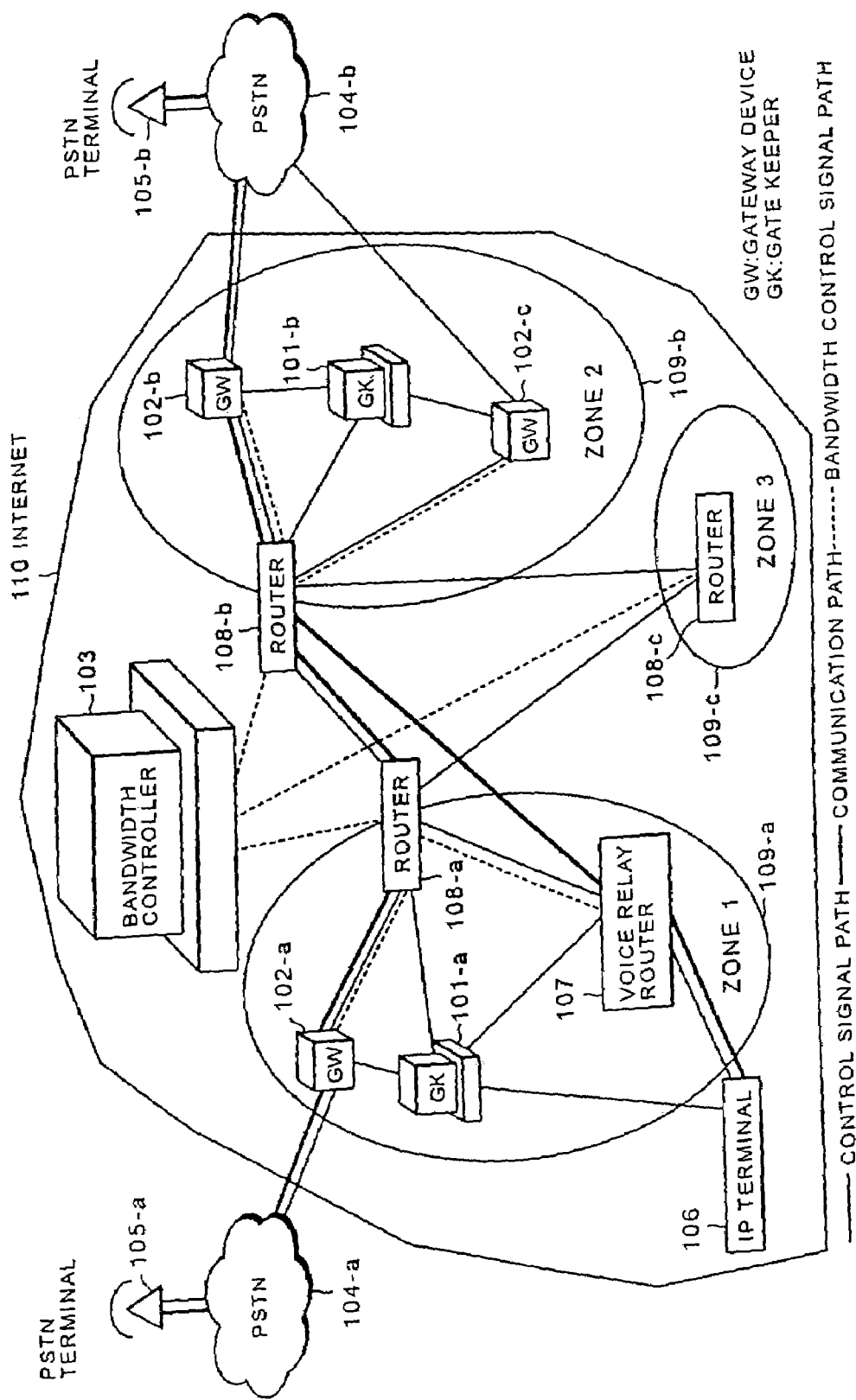
FIG. 1 is a diagram showing an Internet telephone system according to the present invention.

FIG. 1 is a diagram showing the construction of an Internet telephone system according to the present invention. In the following description, subscripts a, b, c of the elements in the Internet (110) represent the corresponding elements in zones 1, 2, 3, respectively. The subscripts a, b of a PSTN (publich switched telephone network) (104) and a PSTN terminal (105) represent the first and second ones connected to the Internet (110). When no subscript is provided to an element in the description, the element is common to the respective zones, the respective PSTN, etc.

In general, plural zones (109) exist in the Internet (110). The Internet (110) is provided with intra-LAN connection devices such as a gate keeper (101), a gateway device (102), a bandwidth controller (103), an IP terminal (106), a voice relay router (107), a router (108), etc. in each zone (109). A PSTN (104) accommodates PSTN terminals (105) therein, and is connected to the Internet (110) through a gateway device (102).

The respective numbers of the gate keepers (101), the gateway devices (102), the voice relay routers (107), the routers (108), etc. which are provided in each zone (109) is not limited to specific values, and they may be equal to 1 or more. The gate keeper (101) manages the gateway device (102) and the voice relay router (107) in the zone (109), and it performs conversion processing of determining from a telephone number the address of a called side gateway device(102) or voice relay router (107) which is needed to set a communication path between gateway devices (102) or between a gateway device (102) and an IP terminal (106). A part or all of the function of the gate keeper (101) may be contained in the gateway device (102). The gateway device (102) supports an interface such as a user network interface, a common line signal type interface or the like, and is connected to a PSTN (104). The voice relay router (107) controls the communication bandwidth to relay a voice call. The bandwidth controller (103) performs a bandwidth control between devices in the Internet (110). A part or all of the function of the bandwidth controller (103) may be contained in any one gate keeper (101). The IP terminal (106) has a microphone, a speaker, etc., and has a function of performing a voice communication with the PSTN terminal (105) connected to the PSTN (104).

Next, the operation will be briefly described.

Each gateway device (102) notifies the set attribute information to the gate keeper (101) of a zone (109) to which the gateway device (102) concerned belongs. The gate keeper (101) manages the notified attribute information of all the gateway devices (102) in the zone (109), and transfers the attribute information of the gateway devices (102) in the zone (109) thereof to the gate keepers (101) of the other zones (109).

When a PSTN terminal (105) sets up a call, the gateway device (102) at the calling side which receives a call setup instruction inquires about the address of a device at a connection destination to the gate keeper (101). The gate keeper (101) informs the address of a proper gateway device (102) at a called side which can communicate. On the other hand, when an IP terminal (106) sets up a call, the IP terminal (106) inquires about the address of a device at a connection destination to the gate keeper (101), and the gate keeper (101) informs the address of a proper gateway device (102) at a called side which can communicate.

In the following description, the Internet telephone using the gateway device (102) is based on the procedure of H.323 of ITU-T, but the present invention is likewise applicable even if other protocol procedures such as MGCP, SIP, etc. of IETF are used. Further, each signal is communicated through the intra-LAN connection devices such as the router (108), etc., and the operation of these devices is assumed to be in compliance with the existing Internet protocol.

Figure 2:
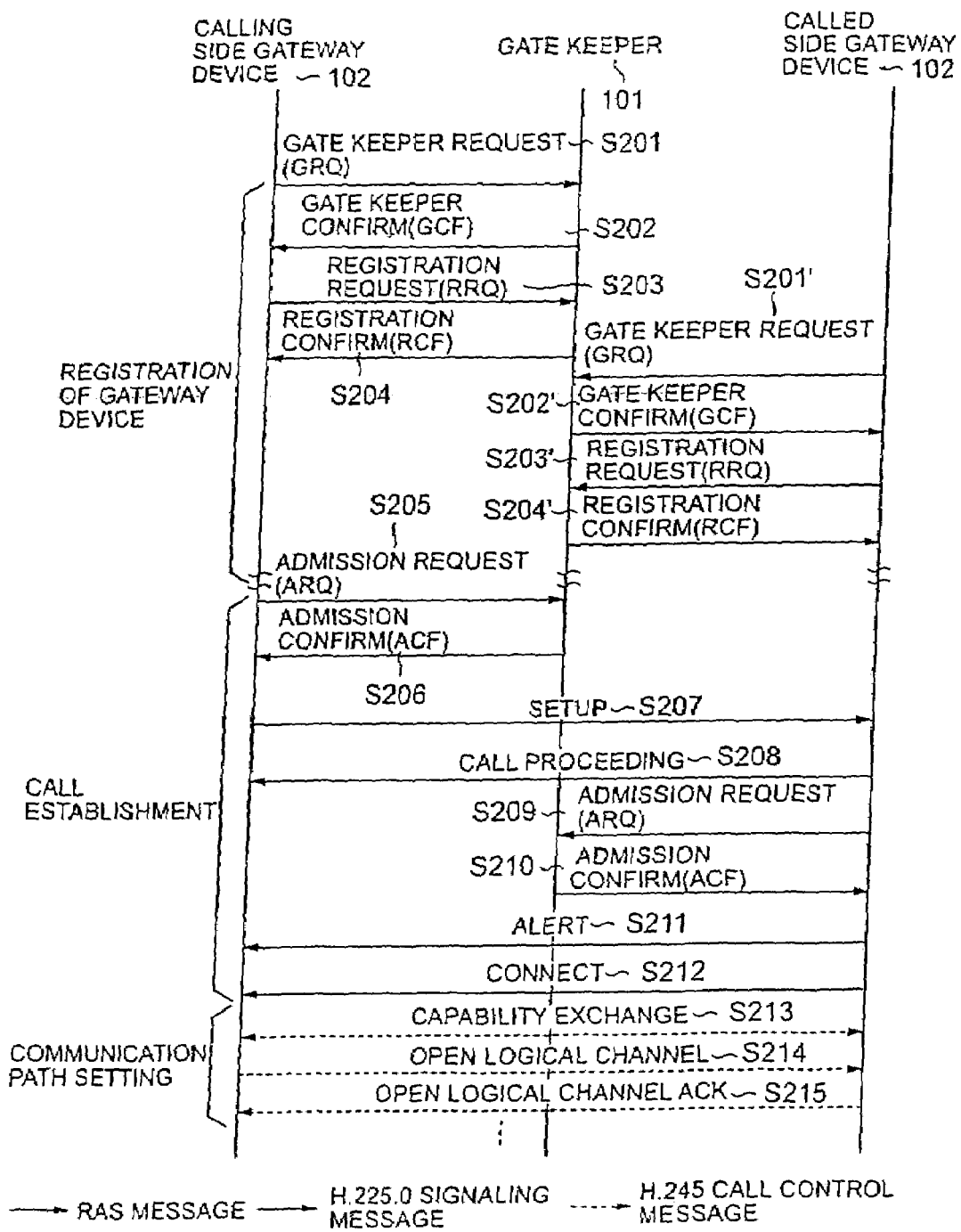
FIG. 2 is a sequence diagram of a call setup procedure.

FIG. 2 is a sequence diagram showing a call setup procedure. FIG. 2 shows the procedure from the registration of the gateway device (102) by the conventional prior art (e.g., ITU-T H.323 Standard) to the establishment of a call and the setting of a communication path. A "call" is connected from a PSTN terminal (105) accommodated in a PSTN (104) to which the calling side gateway device (102) is connected to a PSTN terminal (105) accommodated in a PSTN (104) to which the called side gateway device (102) is connected. In order to simplify the description, only one gate keeper (101) is assumed to be provided in the zone (109), but the number of the gate keeper is not limited to 1.

As a first procedure, registration of a gateway device is executed. First, each of the calling side gateway devices (102) and the called side gateway device (102) causes themselves to be registered, on the basis of an RAS signal, in the gate keeper (101) managing the zone (109) to which the gateway device concerned belongs. The calling side gateway device (102) transmits GRQ to all the gate keepers (101) in order to confirm the gate keeper (101) in which the calling side gateway device (102) is registered (S201). The gate keeper (101) which is able to register the gateway device (102) concerned responds to GRQ by using GCF (S202). The calling side gateway device (102) for which the gate keeper (101) to register the gateway device concerned is determined requests the gate keeper (101) to register itself into a zone (109) managed by the gate keeper (101) by using PRQ (S203). The gate keeper (101) responds to the PRQ by using RCF when it can register the gateway device (S204). The same registration processing is carried out on the called side gateway device (102) (S201' to S204').

As a second procedure, establishment of a call is executed. In this case, there will be described a case where a ITU-T H.225.0 and H.254 message or the like is directly transmitted/received between the calling side gateway device (102) and the called side gateway device (102) through no gate keeper (101). The calling side gateway device (102) transmits ARQ to the gate keeper (101) in order to request a communication allowance with the RAS signal (S205). The gate keeper (101) responds with ACF while overlaying a proper signaling message communication address on the ACF (S206). The calling side gateway device (102) transmits a call setup request (setup) to the called side gateway device (102) with ITU-T H.225.0 message or the like (S207). The called side gateway device (102) which receives the call setup request returns a call proceeding message (S208), and also transmits ARQ to the registering gate keeper (101) to request the communication allowance with the RAS signal (S209). When receiving ACF from the gate keeper (101) (S210), the called side gateway device (102) transmits an alert message (S211) and a connect message (S212) to the calling gateway device (102).

As a third procedure, setting of a communication path established is executed. In this case, there will be described a case where the ITU-T H.245 message is directly transmitted/received between the gateway device (102) at the calling side and the gateway device (102) at the called side through no gate keeper (101). Initial setting based on Capability Exchange (S213) and setting of communication information types and services based on Open Logical Channel (S214) and Open Logical Channel Ack (S215) are performed between the calling gateway device (102) and the called gateway device (102).

Figure 3:
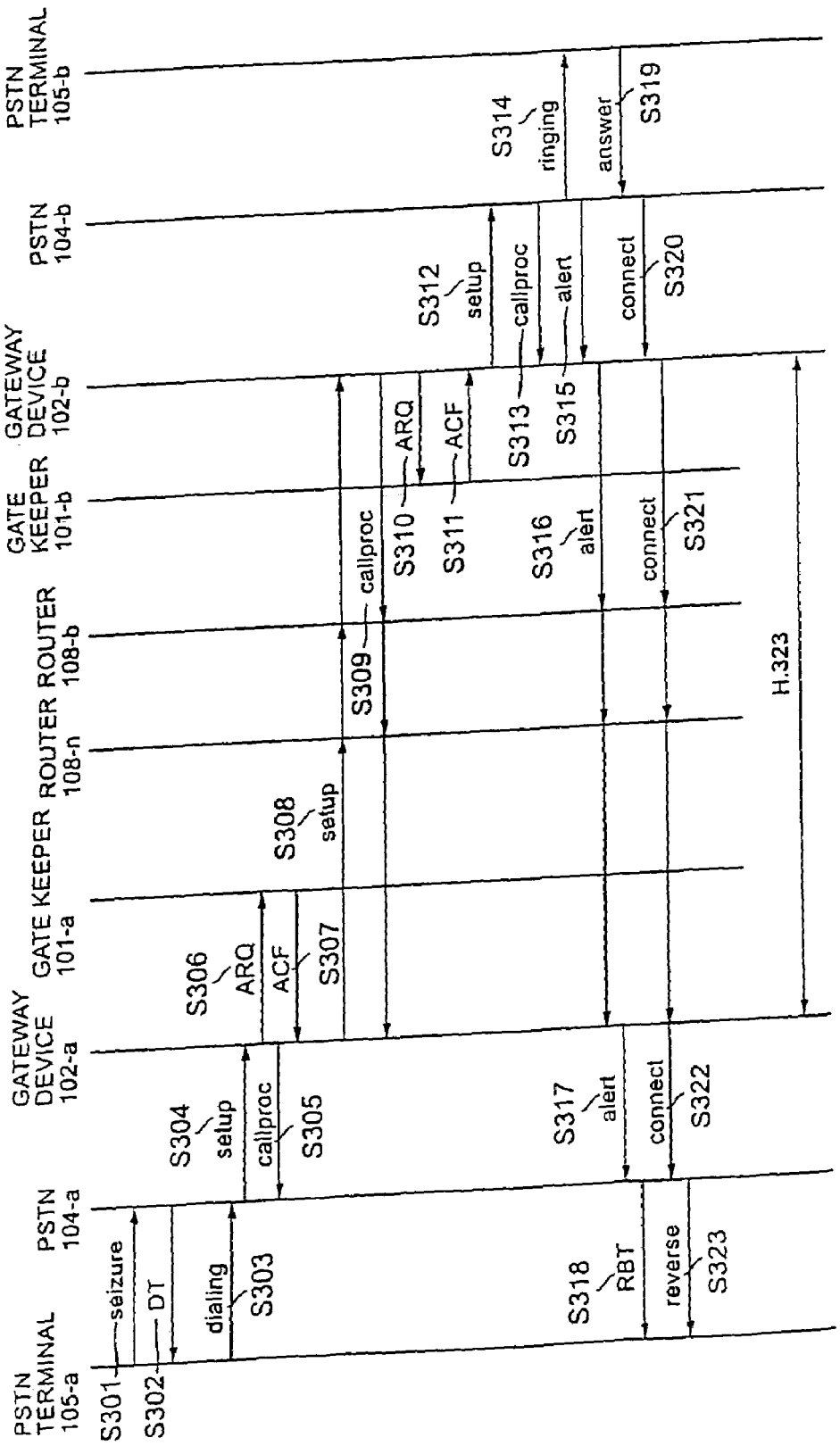
FIG. 3 is a sequence diagram of a call connection between a calling side PSTN terminal and a called side PSTN terminal.

FIG. 3 is a sequence diagram showing a call connection between a PSTN terminal at a calling side and a PSTN terminal at a called side, and specifically FIG. 3 shows a normal call connection sequence when a PSTN terminal (105-*a*) initiates a call and a PSTN terminal (105-*b*) receives the call using the Internet telephone of FIG. 1. Here, ITU-T H.323 is used as the communication protocol for call connection in the Internet (110).

First, the PSTN terminal (105-*a*) is taken off-hook and activated (S301), a dial tone is checked (S302) and then a selection signal is transmitted (S303). In this case, since the Internet telephone is used, the phone prefixes allowed by the gateway device (102-*a*) concerned may be added to a calling number. A PSTN (104-*a*) transmits a setup message with the calling number to the gateway device (102-*a*) (S304) and receives a call proceeding (callproc) message (S305). The gateway device (102-*a*) notifies a call setup to the gateway device (102-*b*) according to the call establishment procedure of ITU-T H.323 shown in FIG. 2, for example (S306 to S309). After the gateway device (102-*b*) at the called side which receives the notification transmits/receives ARQ and ACF with the gate keeper (101-*b*) managing the zone 2 (109-*b*) (S310, S311), and then transmits the setup message to the PSTN (104-*b*) in which the called PSTN terminal (105-*b*) is accommodated (S312). In the PSTN (104-*b*), after the call proceeding message is returned (S313), an alert notification is output to the PSTN terminal (105-*b*) (S314), and at the same time an alert message is transmitted to the gateway device (102-*b*) (S315). The gateway device (102-*b*) transmits an alert message to the calling side gateway device (102-*a*) through appropriate routers (108-*a*, 108-*b*) (S316), and a ring back tone arrives to the calling side PSTN terminal (105-*a*) (S317, S318). When the PSTN terminal (105-*b*) responds (S319), a response signal is notified through each device to the PSTN terminal (105-*a*) (S320 to S323).

Figure 4:
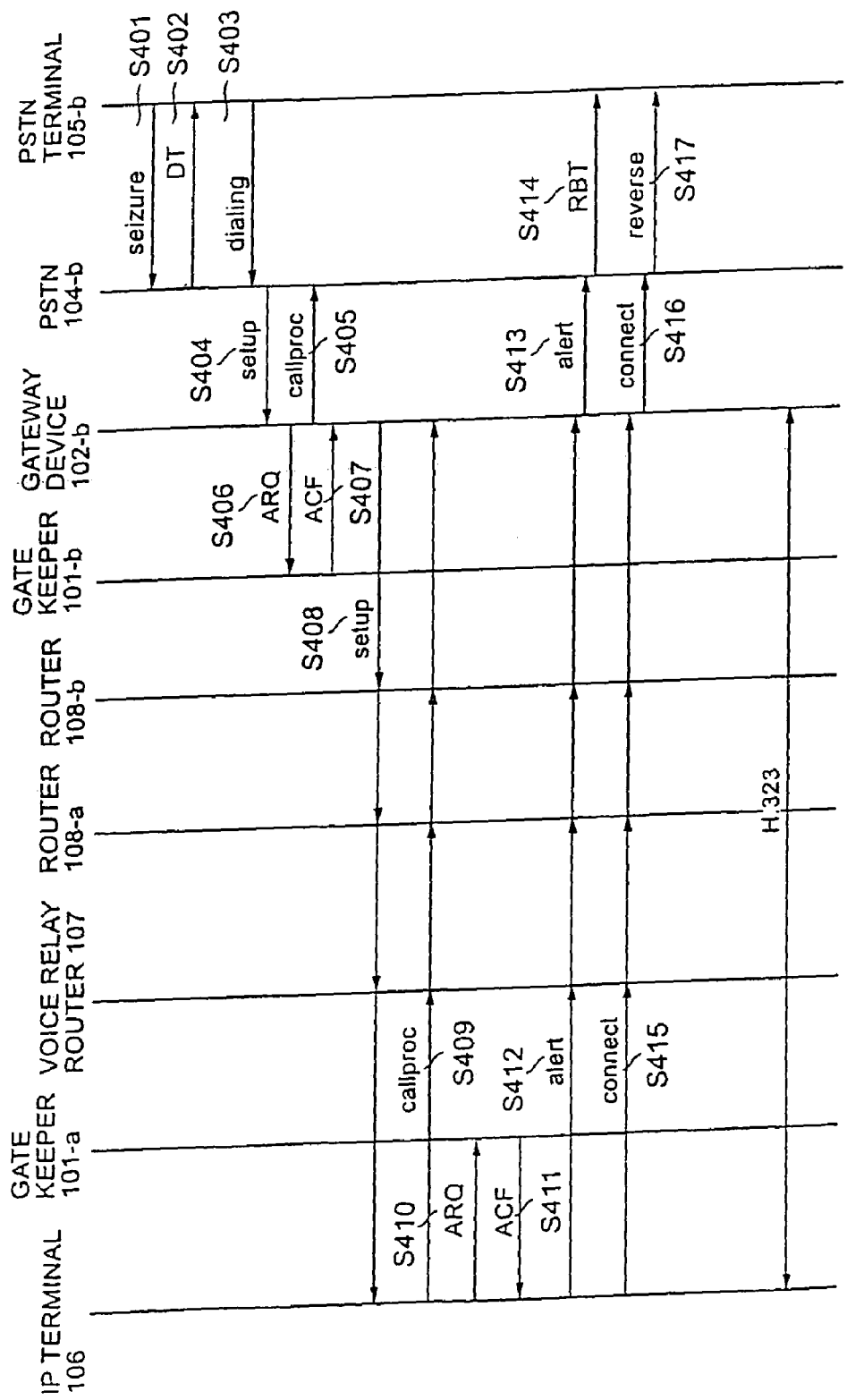
FIG. 4 is a sequence diagram of a call connection between a calling side PSTN terminal and a called side IP terminal.

FIG. 4 is a sequence diagram showing a call connection for the calling side PSTN terminal—the called side IP terminal in FIG. 1, and shows a normal call connection sequence when the PSTN terminal (105-*b*) initiates a call and the IP terminal (106) receives the call using the Internet telephone of FIG. 1. Here, ITU-T H.323 may be used as the call connection communication protocol in the Internet (110).

The procedure from S401 to S407 is the same as the procedure from S301 to S307 shown in FIG. 3. Thereafter, the calling side gateway device (102-*b*) transmits a setup message through an appropriate route to the IP terminal (106) which is the called side terminal (S408). The IP terminal (106) returns a call proceeding message (S409) and then transmits/receives ARQ and ACF with the gate keeper (101-*a*) (S410, S411). Subsequently, it transmits an alert message to the calling side gateway device (102-*b*), and a ring back tone finally arrives at the calling side PSTN terminal (105-*b*) (S413, S414). Thereafter, when the IP terminal (106) makes a reply (connect), a connect signal is notified through each device to the PSTN terminal (105-*b*) (S415 to S417).

Figure 5:
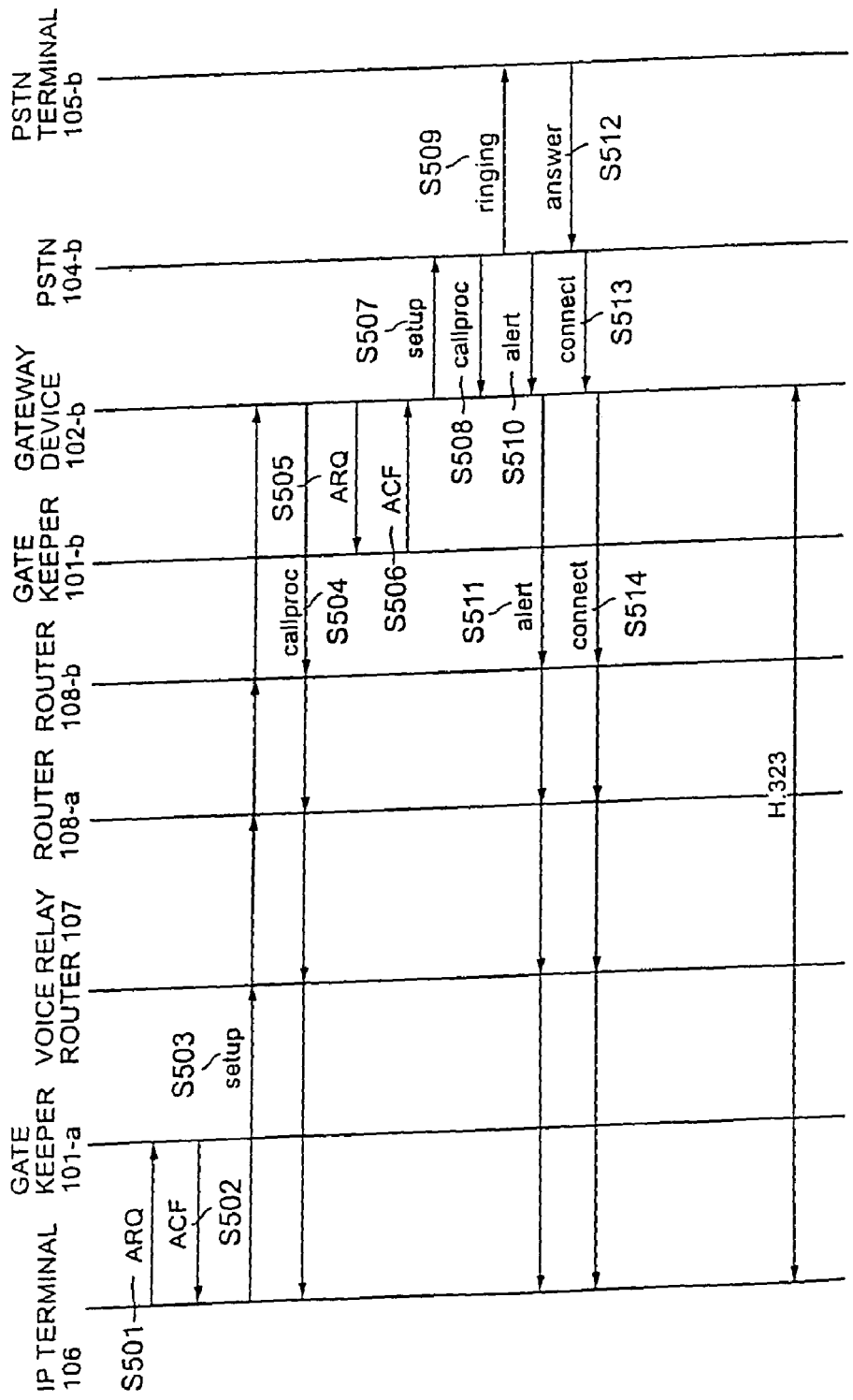
FIG. 5 is a sequence diagram of a call connection between a calling side IP terminal and a called side PSTN terminal.

FIG. 5 is a sequence diagram showing a call connection between a calling side IP terminal and a called side PSTN terminal, and shows a normal connection sequence when the IP terminal (106) initiates a call and the PSTN terminal (105-*b*) received the call using the Internet telephone of FIG. 1. Here, ITU-T H.323 is used as the call connection communication protocol in the Internet (110).

The IP terminal (106) notifies a call setup to the gateway device (102-*b*) according to the call establishment procedure of ITU-T H.323 shown in FIG. 2, for example (S501 to S504). The called side gateway device (102-*b*) outputs an alert notification to the PSTN terminal (105-*b*) in the same manner as the procedure shown in FIG. 3 (S310 to S314) (S505 to S509), and transmits alert and connect messages to the IP terminal (106) (S510 to S514).

(2) Gate Keeper

Figure 6:
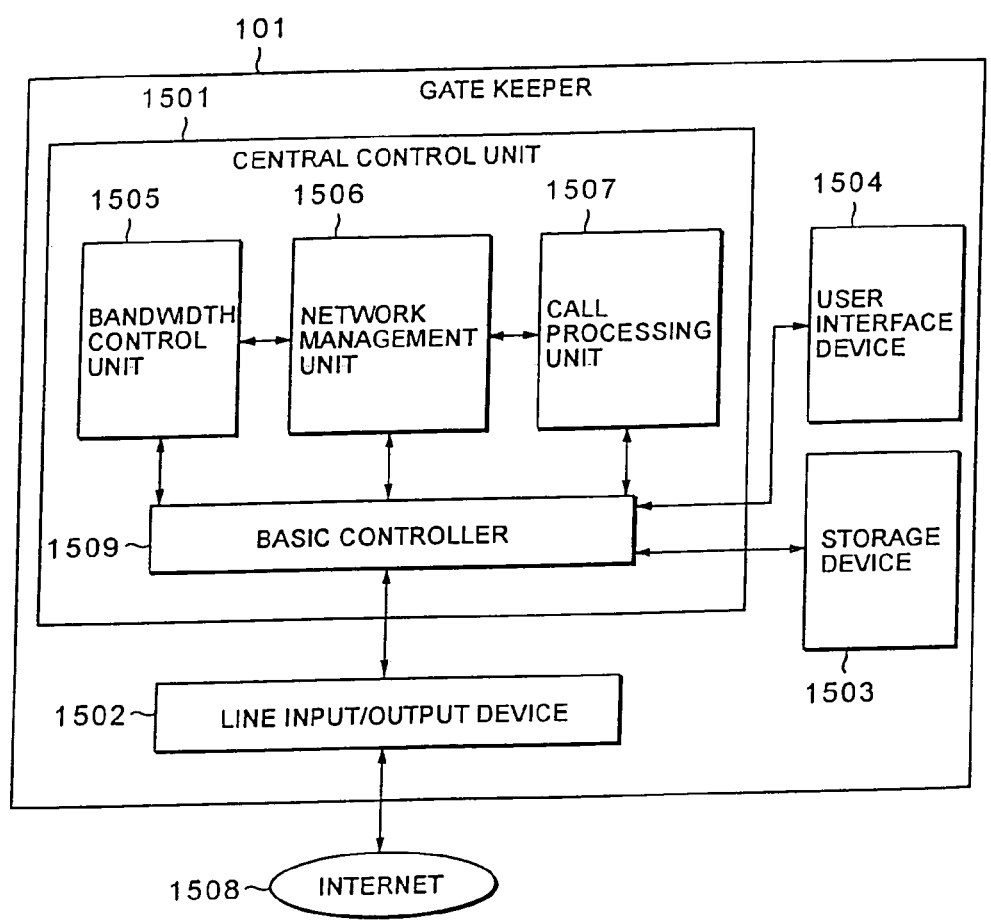
FIG. 6 is a functional block diagram of a gate keeper according to the present invention.

FIG. 6 is a functional block diagram of the gate keeper according to the present invention.

The gate keeper (101) is implemented by installing application software on a UNIX server or PC server, and it mainly comprises a line input/output device (1502), a central control unit (1501), a storage device (1503) and a user interface device (1504). In this case, as an example, there will be described a case where the gate keeper (101) and the bandwidth controller (103) are together. These devices may be constructed independently and separately.

The central control unit (1501) corresponds to the CPU on the server, and each block shown therein represents a functional block of software executed on the CPU. A basic controller (1509) corresponds to OS, and serves as an interface with each device and controls execution of an application shown by 1505 to 1507. In this case, it implements a basic communication protocol such as IP, UDP, or TCP needed for communications through the Internet (1508). The line input/output device (1502) is connected to the Internet (1508) to perform communications, and it comprises a generally-used LAN board. In this case, it performs the processing corresponding to layer 1 and 2 in the LAN interface. The storage device (1503) is a memory device implemented by a magnetic disc, an optical disc or the like which is installed in a server. It may be constructed as a disc server by an independent device in accordance with the scale of the network. In general, the storage device (1503) is enhanced in reliability by using an existing fault tolerance function such as mirroring, duplexing or the like. The user interface device (1504) comprises a display, a keyboard, a mouse, etc. as in the case of an ordinary server.

Figure 16:
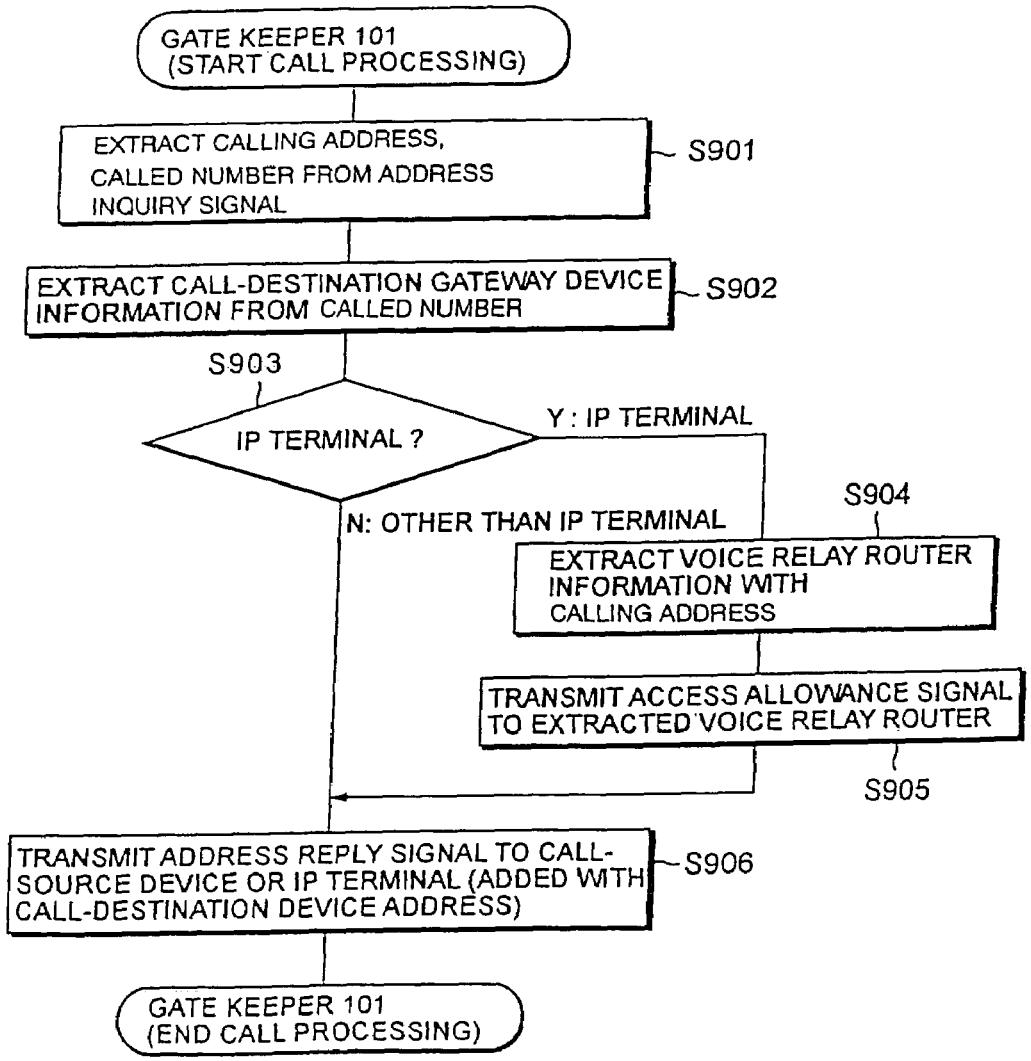
FIG. 16 is a flowchart showing the processing in the gate keeper when a call is set up.

The central control unit (1501) has a bandwidth control unit (1505), a network management unit (1506) and a call processing unit (1507) as application software which can be implemented. The call processing unit (1507) receives an address inquiry from the IP terminal (106) or the gateway device (102) to select the called side gateway device (102) (the processing flow is shown in FIG. 16). The network management unit (1506) implements standardized functions such as the registration processing of the gateway device (102) specified in ITU-T H.323 Standard or the like and transmission/reception of the attribute information of the gateway device (102) with the other gate keepers. According to this embodiment, in addition to the above existing functions, the monitoring processing of the gateway device (102) shown in FIG. 20 and the restoration processing shown in the sequence diagram of FIG. 21 as described later when incorrectness of attribute information is detected are implemented. The bandwidth control unit (1505) implements the function of the bandwidth controller (103) shown in FIG. 12 as described later. This function may be provided to only the gate keeper functioning as the bandwidth controller. As another example, the bandwidth controller (103) which is independent of the gate keeper (101) may be implemented.

FIG. 7 is a diagram showing a table in a storage device belonging to the gate keeper according to the present invention. In this case, the construction of a management table stored in the storage device (1503) of the gate keeper (101) will be described.

Each of these tables may be provided to the bandwidth controller (103), the gateway device (102) or other fabricated portions. In a case where the gate keeper (101) and the bandwidth controller (103) are separately provided, for example, the gate keeper (101) may be provided with a device status management table (1601), an attribute management table (1605) and a bandwidth reservation condition table (1610) while the bandwidth controller (103) may be provided with a bandwidth reservation status stable (1610) and a bandwidth reservation schedule table (1613).

The device status management table (1601) manages the relationship between the status of the gateway device (102) and the voice relay router (107) in the Internet (110) and the gate keeper (101) managing it. In the system, the gate keeper (101), the gateway device (102) and the voice relay router (107) are managed by normalized numbers. The numbers may be numbers closed in the gate keeper (101) or unique numbers in the overall system. Alternatively, a method of managing IP addresses without using these normalized numbers may be used. In the case of FIG. 7, the gateway devices (102) and the voice relay routers (107) which are represented by the device numbers A to Z are managed by the gate keeper AAA. Three states, namely a "in service" (device number A or the like), "out of service" (device number Z or the like) and "inappropriate data" (device number Y or the like) are provided as the device states, and the device being in service is preferentially used as described above.

In this table, the device state (1604) is automatically updated by the procedure shown in this embodiment. Further, the gate keeper number (1602) and the device number (1603) are generated on the basis of the information collected by the intra-gatekeeper protocol defined in the standard.

The attribute management table (1605) registers therein attribute information permitted by each device, and it is used in combination with a device status management table (1601) to select the gateway device (102) at the call destination. The attribute information is generated on the basis of the information collected by the gate keep-gate keep protocol (gateway location protocol) defined in the standard. As the attribute information, there are provided a device address (1606), a phone prefix allowed (1607), a voice coding specification (1608), a protocol (1609), etc. In addition to these attribute information, a cost plan, a producing method, confederation of membership to be registered, a total line capacity, additional services to be supported, etc. may be managed.

The device address is the IP address of the gateway device (102). The phone prefix allowed (1607) represents an assembly of connectable telephone numbers when a connection is made from the gateway device (102) thereof to a PSTN, and it generally comprises several upper digits of a telephone number which is specified in ITU-T E.164. In the voice coding specification (1608) is registered a protocol specification supported by ITU-T G.711, G.723.1, G.729 or the like. In the protocol (1609) is recorded a protocol specification supported by ITU-T H.323, IETF SIP, IETF MGCP or the like.

Here, plural conditions may be registered in each field of the attribute management table (1605) according to the mount and disposing condition of the gateway device (102). In this case, a method of providing an independent line to each condition may be used. However, in more general terms, it is implemented by a table construction in which such selection of a called gateway device (102) that can be easily performed with each type condition being set as a key by using relational data. Further, the device status management table (1601) may be integrated into the attribute management table (1605). Particularly, since there may be considered a case where the attribute information is partially invalid, the data status may be set to the data invalid status for only special attribute conditions.

In the bandwidth reservation condition table (1610) are registered data on a bandwidth or a band which is secured as a result of the bandwidth reservation processing by the bandwidth control unit (1505). In this case, with respect to each device number (1603), a counterpart device number (1611) and a reservation bandwidth (1612) are assumed to be stored, for example. When a plurality of counterpart devices are provided for a device number (1603), data of plural lines may be provided to the device number (1603).

The bandwidth is usually registered in bits/second. If the reservation bandwidth (1612) is equal to zero, it means that no reservation is made.

The bandwidth reservation schedule table (1613) is used to register a condition under which the bandwidth control unit (1505) starts the bandwidth reservation processing, and it may be set by the network administrator. In this case, as an example, a device number (1603), a counterpart device number (1611) and a reservation bandwidth (1615) are registered with regard to time (1614). In this case, the reservation bandwidth (1615) is also registered in bits/second, and if it is equal to zero, it means cancel of reservation. The gate keeper (101) is designed to automatically start the reservation procedure at the time (1614) registered in the bandwidth reservation schedule table (1613).

The bandwidth reservation schedule table (1613) may be provided at least onto the bandwidth controller (103) or the gate keeper (102) having the function as a bandwidth controller.

(3) Gateway Device

FIG. 8 is a functional block diagram showing the gateway device according to the present invention. The gateway device (102) is implemented by a storage device (1702), a communication control switch (1709), a line input/output device (1703), a PSTN input/output device (1704), a voice processor (1710), and a central processing unit (1701) as main hardware constituent elements.

The storage device (1702) is a memory device implemented by a magnetic disc or an optical disc based on the existing techniques, and used to store the device status, the traffic information, the bandwidth reservation information, the device attribute, etc. The communication control switch (1709) implements buffering and distribution of transmission/reception signals between the gateway device (102) and the Internet (1508) or the PSTN (1712), and serves to control the lines and the bandwidths, etc. It may be expected that no communication control switch (1709) exists in a simple gateway device (102). The line input/output device (1703) is connected to the Internet (1508) to perform communications, and comprises a generally-used network interface card or the like. This implements the function of the physical layer and the data link layer in OSI model. In accordance with the scale of the network, it may be designed in the form of an intelligent type having a CPU and a memory on a card to execute protocol processing. The PSTN input/output device (1704) implements input/output of a control signal and a voice signal transmitted/received with the PSTN (1712), and it implements the function of the physical layer and the data link layer in the OSI model. The voice processing device (1710) implements a function of converting speech packets transmitted/received in the Internet (1508) when a voice signal is transmitted/received with the PSTN (1712), whereby speech is transmitted/received between the Internet (1508) and the PSTN (1712).

The central control device (1701) corresponds to CPU of the gateway device (102), and in general it may be multiplexed by an existing technique such as a multiprocessor system, a duplex system, a dual system or the like so as to improve reliability and processing capability. The internal blocks in FIG. 8 are particularly associated in the present invention with the functional blocks of the software executed by the CPU. A basic controller (1718) is a middleware corresponding to an OS. It implements an interface with each device, and also controls execution of other application software. As described above, it implements more primitive processing compared to the other software, so that a higher execution level and a higher priority are given to the basic controller (1718) than the other application software. In this case, it implements a basic communication protocol such as IP, UDP, TCP or the like which is needed for communications through the Internet (1508).

The bandwidth control unit (1705) is application software which implements the bandwidth reservation, the reservation cancel, the reservation alteration, the monitoring, etc. The bandwidth reservation procedure between the gateway device (102) and the counterpart device is implemented on the basis of the RSVP procedure according to the procedure shown in FIG. 11 as described later. The procedure of dynamically altering the reservation bandwidth on the basis of the control of the gate keeper (101) is implemented according to the procedure of FIG. 12 as described later. The reservation bandwidth monitoring procedure between the gateway device (102) and the counterpart gateway device is implemented according to the procedure of FIG. 13 as described later.

Next, a traffic collection unit (1706) is application software for implementing a traffic information collection function, etc. at the gateway device (102) side when a traffic information collection is requested to the gateway device (102) as information to determine a bandwidth to be reserved before the gate keeper (101) controls the reserved bandwidth of the gateway device (102). In this case, it periodically calculates indexes representing the performance of the network and then storing the calculation result in the storage device (1702). When receiving a traffic information collection request signal from the gate keeper (101), it extracts necessary and sufficient information from the indexes in the storage device (1702). Here, as the indexes representing the performance of the network, there is provided response time, throughput, traffic amount of each route, variance of delay and time-of-day or week of traffic, line usage rate, buffer usage rate, bit error rate, availability, etc. The gate keeper (101) collects these items of information from the gateway device (102) and the voice relay router (107) under its control, and determines the optimum reservation bandwidth.

When the call processing unit (1708) detects the incorrectness of transmission/reception of a call control signal with the counterpart gateway device at the start time of the basic communication service of the Internet telephone, a problem management unit (1707) is application software which implements a function of notifying the above information to the gate keeper (101) at the management side and monitoring the restoration. Problem detection, attribute abnormality detection, problem restoration and attribute abnormality restoration are performed according to the procedure shown in FIGS. 19 and 21 described later. Further, the call processing unit (1708) is application software for analyzing the call control signal transmitted/received in the PSTN (1712) and the Internet (1508) and providing the service in accordance with the signal. Since the Internet (1508) and the PSTN (1712) usually use different protocols, the call processing unit has a protocol conversion function between the two. In addition to the basic communication service, various additional services including the routing function dependent on the reservation bandwidth and the problem information can be implemented.

There may be considered a system in which the call processing unit (1708) exists in the form of a signaling gateway device (1713) as a separate device from the central processing unit (1701) and controls the gateway device (102). In this case, as shown at the lower side of FIG. 8, the signaling gateway device (1713) includes a storage device (1717), a line input/output device (1716), a common line signal input/output device (1719) and a central processing unit (1714). In this case, the call processing function such as the protocol conversion, etc. which is implemented by the call processing unit (1708) is executed by the signaling gateway device (1713), and the gateway device (102) is managed at the interface via the Internet (1508) or a leased line by the managing unit (1715). The gateway device (102) has functions specified by the other processing. When the common line signal type interface is supported, signaling is extracted by the common line signal input/output device (1720), and converted to the protocol used on the Internet (1508), for example, ITU-T H.323 or the like, in the call processing unit (1708) of the signaling gateway device (1713). A UNIX server or the like may be used as the signaling gateway device (1713).

(4) Voice Relay Router

FIG. 9 is a functional block diagram showing a voice relay router according to the present invention. The voice relay router (107) has not only a conventional router function of routing IP packets on the basis of the addresses thereof, but also a function of controlling communication bandwidths. The voice relay router (107) mainly comprises a line input/output device (1803), a central control unit (1801), a storage device (1802) and a communication control switch (1809).

The storage device (1802) is a memory device such as RAM or the like which is contained in a router. The line input/output device (1803) is connected to the Internet (1508) to perform communications, and it comprises a generally-used LAN board or the like. In this case, it performs the processing corresponding to layer 1 and 2 in the LAN interface. The communication control switch (1809) identifies the connection destination on the basis of the address of IP packets, and performs the routing between devices in the Internet (1508) or takes the packets into the application in the voice relay router.

The central control unit (1801) corresponds to the CPU on the server, and each internal block in the figure represents a functional block of software executed on the CPU. A basic controller (1804) corresponds to an OS. It implements an interface with each device and controls execution of each application described below. In this case, the basic communication protocol such as IP, UDP, or TCP which are needed for communications through the Internet is implemented.

Figure 11:
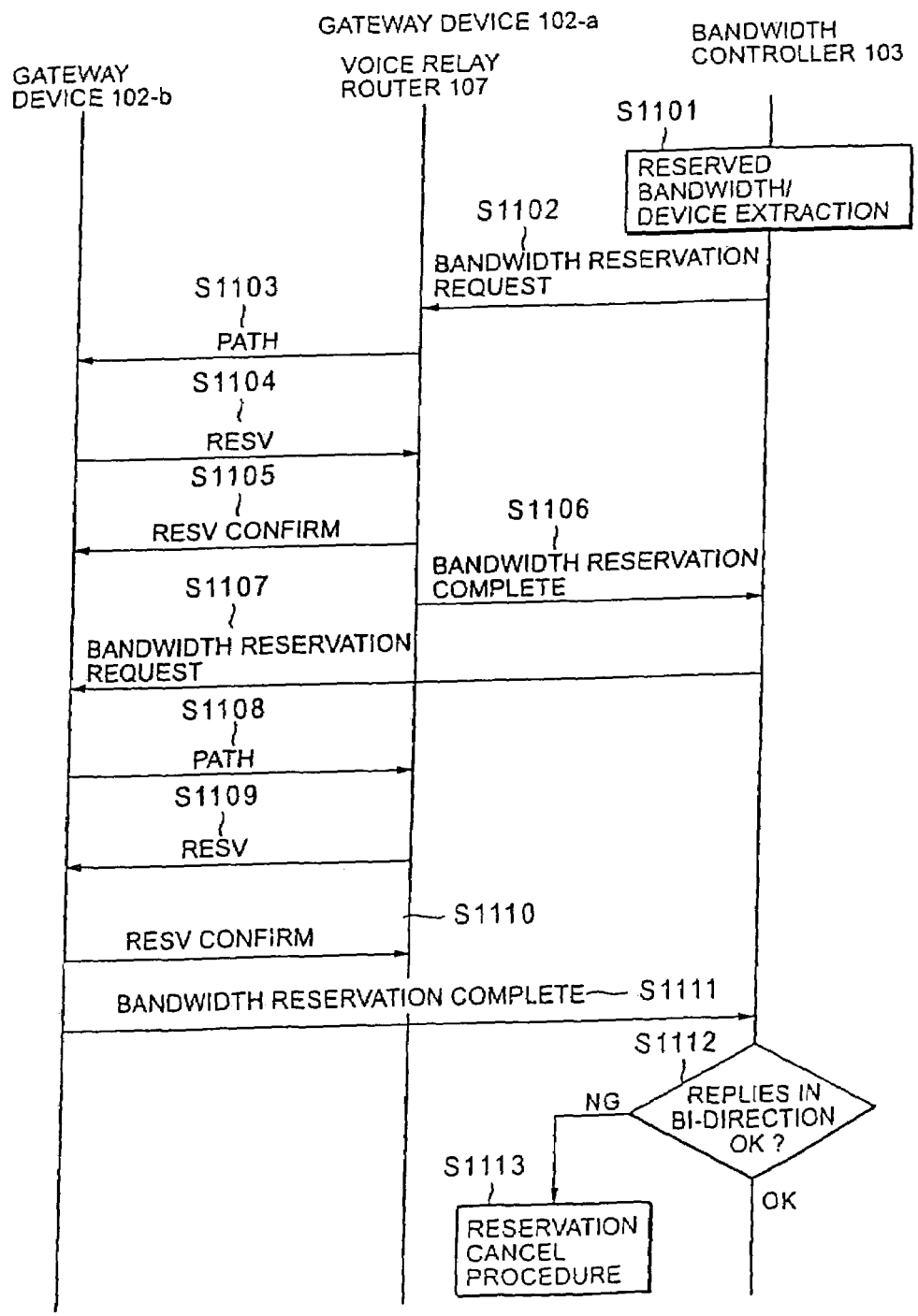
FIG. 11 is a sequence diagram showing a procedure of a bandwidth reservation between devices by the bandwidth controller according to the present invention.

As the application software implemented in the central control unit (1801) are provided a bandwidth control unit (1805), a traffic collection unit (1806), a problem management unit (1807), a route control unit (1808), etc. The bandwidth control unit (1805) implements a function as shown in FIG. 11 as described later on the basis of the RSVP protocol procedure, for example. The traffic collection unit (1806) is application software for implementing the traffic information collection function at the voice relay router (107) side when the traffic information collection is requested to the voice relay router (107) as information to determine a bandwidth to be reserved before the reserved bandwidth of the voice relay router (107) is controlled by the gate keeper (101). In this case, there are calculated, periodically, indexes representing the performance of the network such as response time, throughput, traffic amount of each route, delay variance and time-of-day or week of traffic, line usage rate, buffer usage rate, bit error rate, availability, etc.

Figure 14:
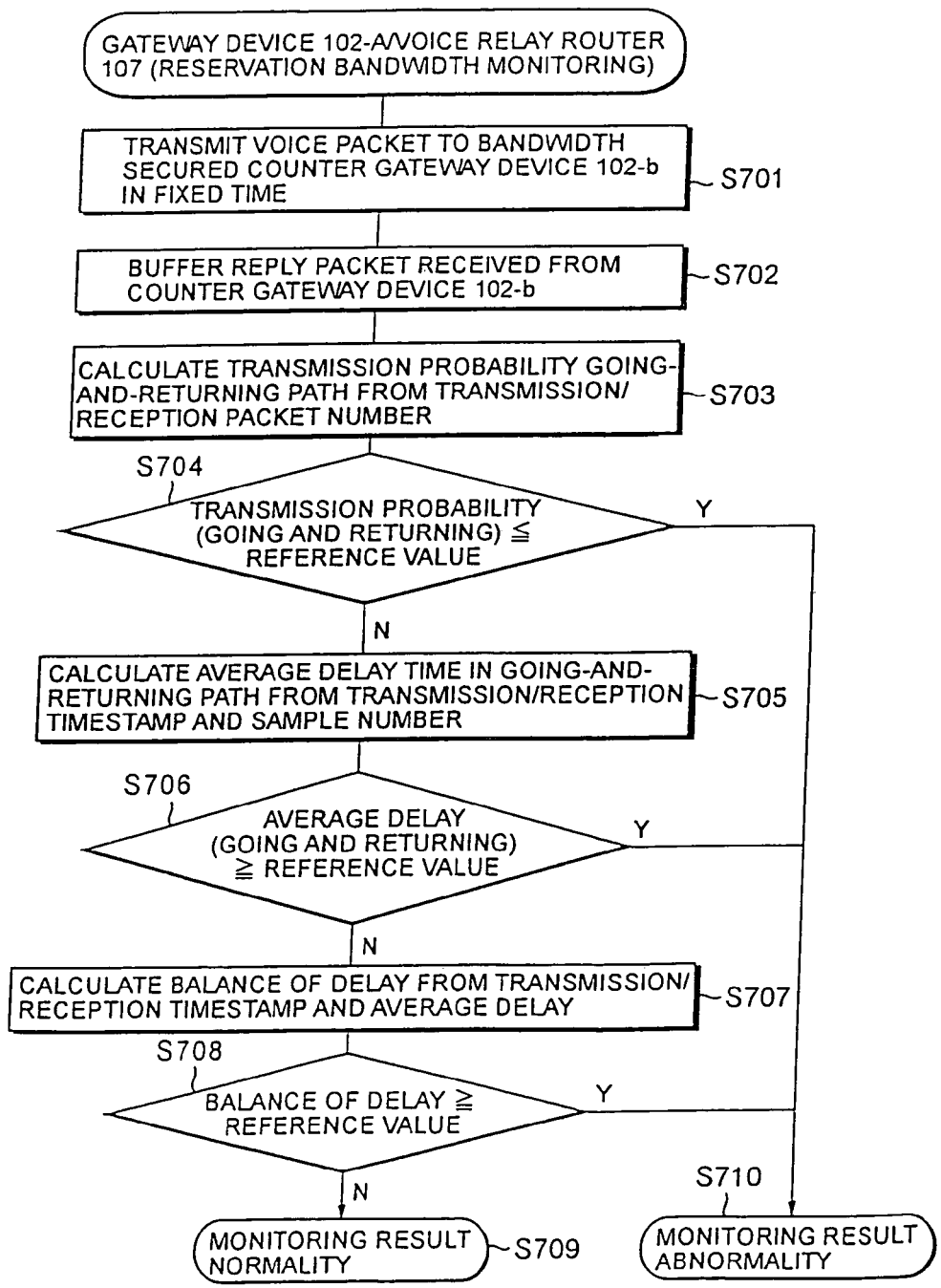
FIG. 14 is a flowchart showing the processing in the gateway device and the voice relay router during the periodic monitoring operation of the communication path under the bandwidth reservation.

The traffic collection unit (1806) serves to store these indexes into the storage device (1702), and extract necessary and sufficient information from these indexes to return the information when receiving a traffic information collection request from the gate keeper (101). The problem management unit (1807) implements a function of monitoring a communication path under the bandwidth reservation as shown in FIG. 14 which will be explained later. The route control unit (1808) implements a function of preferentially using a route for which a bandwidth is reserved when the routing is applied to each IP packet. Further, in this embodiment, the route control unit (1808) has a function of comparing the address in an access allowance signal received from the gate keeper (101) and the address of the IP terminal (106), and the processing flow is briefly shown in FIG. 17.

(5) Communication Bandwidth Reservation

Figure 10:
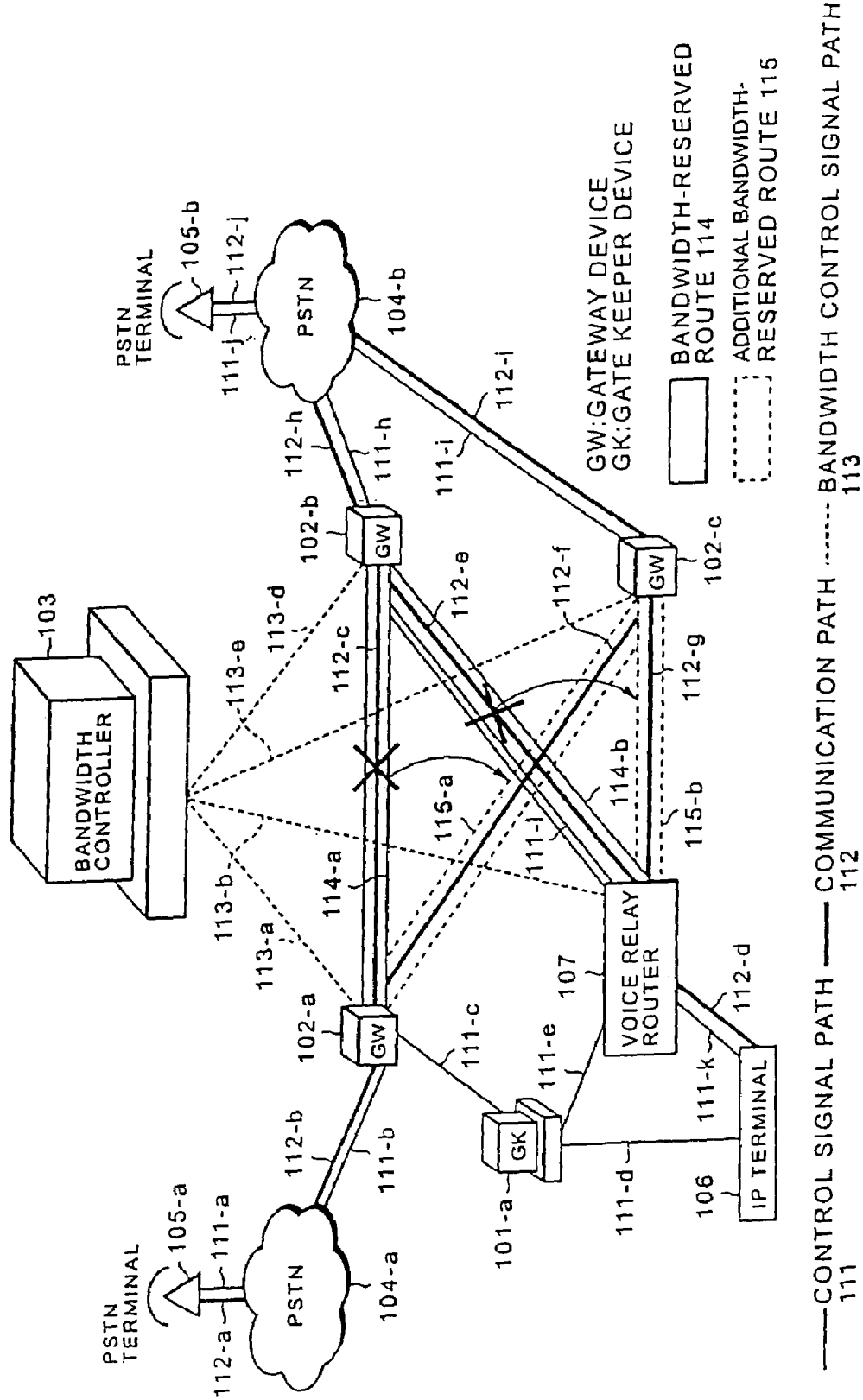
FIG. 10 is a diagram showing a system construction in which a bandwidth controller manages a communication bandwidth.

FIG. 10 is a diagram showing the system construction in which the bandwidth controller manages the communication bandwidth. In this case, FIG. 10 shows an image of the system construction in which a communication bandwidth is reserved by the bandwidth controller (103). It is assumed that the bandwidth controller (103) instructs a gateway device (102-*a*), a gateway device (102-*b*) and a voice relay router (107) to reserve communication bandwidths between the gateway device (102-*a*) and the gateway device (102-*b*) and between the voice relay router (107) and the gateway device (102-*b*) (114-*a*, 114-*b*). Communication paths (112-*c*, 112-*e*) for which communication bandwidths are reserved are periodically monitored with respect to communication quality, etc. by devices having the communication paths. When the communication quality of the communication path is deteriorated, each device notifies it to the bandwidth controller (103). At this time, the bandwidth controller (103) searches for an additional communication path and reserves a communication bandwidth.

FIG. 10 is an image diagram showing the case where the deterioration of the communication quality of the reserved communications (112-*c*, 112-*e*) are detected according to the monitoring procedure of the reservation communication bandwidth, and the gateway device (102-*a*)—the gateway device (102-*c*) and the voice relay router (107)—the gateway device (102-*c*) are set as additional routes (112-*f*, 112-*g*) to thereby perform the bandwidth reservation (115-*a*, 115-*b*).

Next, each procedure will be described with reference to FIG. 10.

FIG. 11 is a sequence diagram showing the procedure of the bandwidth reservation between the devices by the bandwidth controller according to the present invention. FIG. 11 shows the procedure when the communication bandwidth between the gateway device (102-*a*) and the gateway device (102-*b*) and between the voice relay router (107) and the gateway device (102-*b*) is reserved. For example, RSVP of IETF is applicable as the procedure between devices for which the bandwidth is reserved. In the case of voice communication, the reservation must be made bi-directionally because it needs up/down communications.

The bandwidth controller (103) extracts a communication bandwidth to be reserved and devices at the time when an instruction is received from the outside, at a scheduled time or at a proper timing (S1101). Next, the bandwidth controller (103) transmits a bandwidth reservation request through bandwidth control signal paths (113-*a*, 113-*b*) to one gateway device (102-*a*) or voice relay router (107) to which the reservation is instructed (S1102). The gateway device (102-*a*) or the voice relay router (107) at the transmission side thus instructed determines bandwidth reservation routes (114-*a*, 114-*b*) to the counterpart device, and transmits a route indication to the gateway device (102-*b*) at the reception side (S1103). The gateway device (102-*b*) at the reception side transmits a bandwidth reservation signal to the counterpart device indicated (S1104), and reserves a communication bandwidth between itself and the counterpart device. When the counterpart device completes the bandwidth reservation, it transmits a bandwidth reservation completion signal to the gateway device (102-*b*) at the reception side (S1105). When the gateway device (102-*a*) or the voice relay router (107) at the transmission side reserves the communication bandwidth, the result is transmitted to the bandwidth controller (103) with a bandwidth reservation replay signal (S1106). Here, when some routing nodes are needed as transit nodes between the gateway device (102-*b*) and the gateway device (102*a*)/the voice relay router (107), each node repeats the reservation of the communication bandwidth between the adjacent nodes, and when the gateway device (102-*a*) or the voice relay router (107) at the transmission side finally reserves the communication bandwidth, the result is transmitted to the bandwidth controller (103) with the above bandwidth reservation reply signal (S1106).

Further, at the same time or successively, the bandwidth controller (103) transmits the bandwidth reservation request through a bandwidth control signal path (113-*d*) in the opposite direction to that when the gateway device (102-*b*) is set as the transmission side (S1107), and each of route indication (S1108), bandwidth reservation (S109) and bandwidth reservation completion (S1110) signals is transmitted/received, and the bandwidth reservation reply is received (S1111) after the same processing as described above is carried out. The bandwidth controller (103) which receives the reply signal from the bi-directional sides analyzes the result (S1112). When the replies in both directions are OK, the reservation is assumed to be normally completed. If any one reply is NG, the bandwidth in the reserved direction is canceled in order to maintain equality between up-and-down directions (S1113). For the reservation cancel of the communication bandwidth and the alteration of the reservation content, necessary signals are transmitted/received from both directions, and the same procedure is executed.

Figure 12:
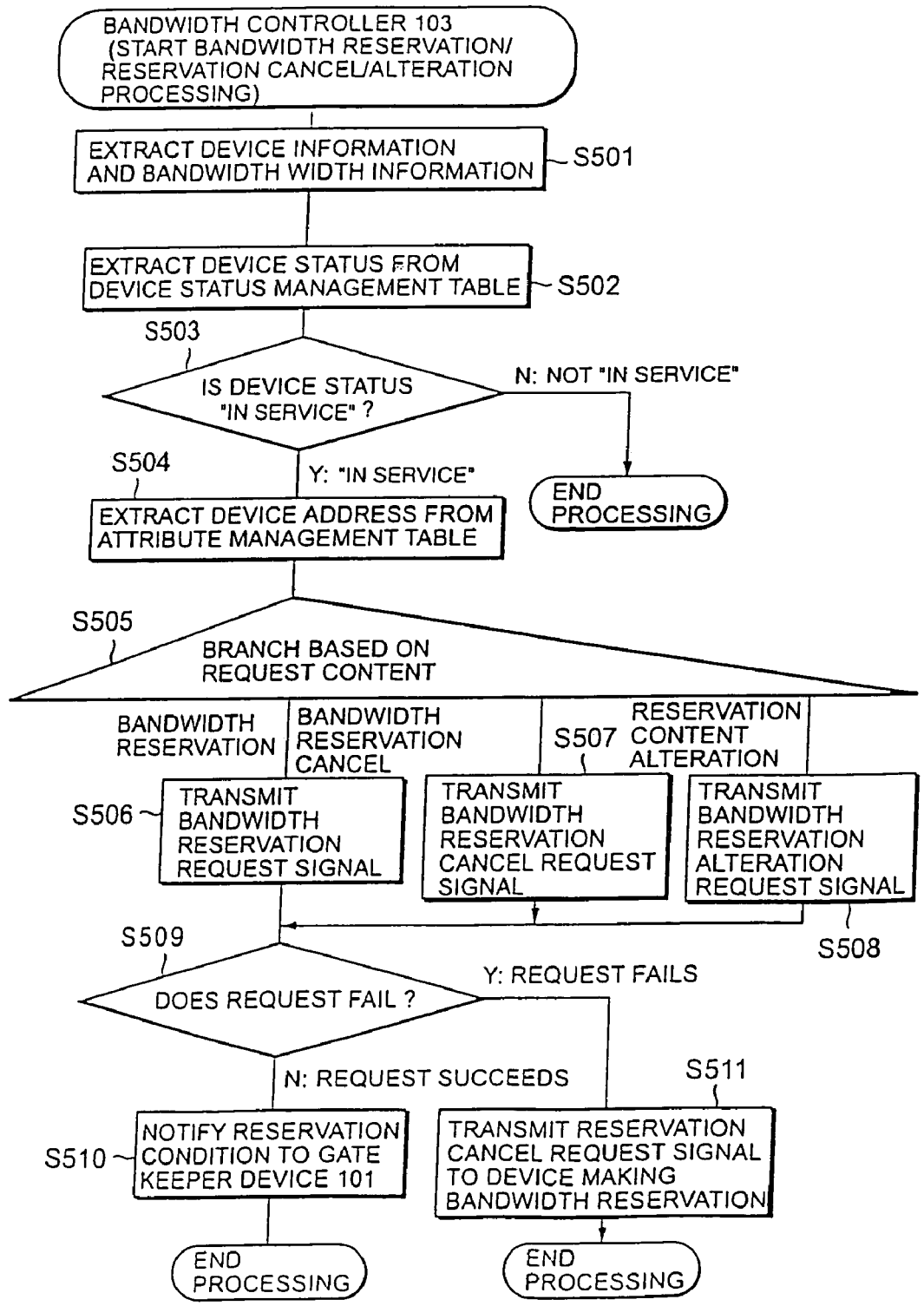
FIG. 12 is a flowchart showing the processing of the bandwidth controller for a bandwidth reservation, a bandwidth reservation cancel and a bandwidth reservation content alteration.

FIG. 12 is a flowchart showing the internal processing of the bandwidth controller for the bandwidth reservation, the bandwidth reservation cancellation and the alteration of the bandwidth reservation content. Here, FIG. 12 shows the bandwidth reservation, the reservation cancel and the reservation content altering function which are executed with a bandwidth control signal path (113) by the bandwidth controller (103). Execution of the bandwidth reservation, the reservation cancellation or the reservation content alteration may be started by inputting a command from a maintenance terminal, at a scheduled time or proper timing, or by scheduling of a bandwidth reservation schedule table (1613) of the gate keeper (101). When the gate keeper (101) and the bandwidth controller (103) are designed as separate devices, the bandwidth controller (103) may be provided with a bandwidth reservation condition table (1610) and a bandwidth reservation schedule table (1613), and starts the above functions on the basis of the above tables. The bandwidth controller (103) obtains information on a device for performing the control and a bandwidth when the bandwidth reservation, the reservation cancel or the reservation content alteration is carried out (S501).

The bandwidth controller (103) properly communicates with each gate keeper (101) to ascertain prescribed data such as the data on the device status and the attribute, etc. On the basis of the device information thus obtained, the device status (1604) of the corresponding device is extracted from the device status management table (1601) of the gate keeper (101) (S502) to judge the device status (S503). If the judgment result indicates that the device status is out of the normal status, this processing is completed. On the other hand, if the device status is the normal status, the address information (1606) of the corresponding device is extracted from the attribute management table (1605) (S504).

Thereafter, on the basis of the information of the device carrying out the control and the bandwidth processing, it is judged whether the processing requested is the bandwidth reservation, the bandwidth reservation cancellation or the reservation content alteration (S505). In accordance with the request content, a bandwidth reservation request signal added with the information of the bandwidth indicated (S506), a bandwidth reservation cancel request signal (S507) or a bandwidth reservation alteration request signal (S508) is transmitted to the device concerned. For the bandwidth reservation cancellation request, the bandwidth is set to zero, and for the bandwidth reservation alteration request, the request is transmitted to the communication bandwidth which has already been reserved. These request signals may be the same signal or proper signals.

Thereafter, upon receiving a reply signal from each device, it is judged on the basis of the signal thus received whether the requested processing succeeds (S509). If the requested processing succeeds, a notification of bandwidth reservation/bandwidth reservation cancel/reservation content alteration is made to the gate keeper (101) (S510), and the gate keeper (101) receiving the notification sets the reservation condition into the bandwidth reservation condition table (1610). On the other hand, if the requested processing fails, the communication bandwidth under reservation which is useless is released (S511).

(6) Monitoring of Bandwidth Reservation Communication Path

Figure 13:
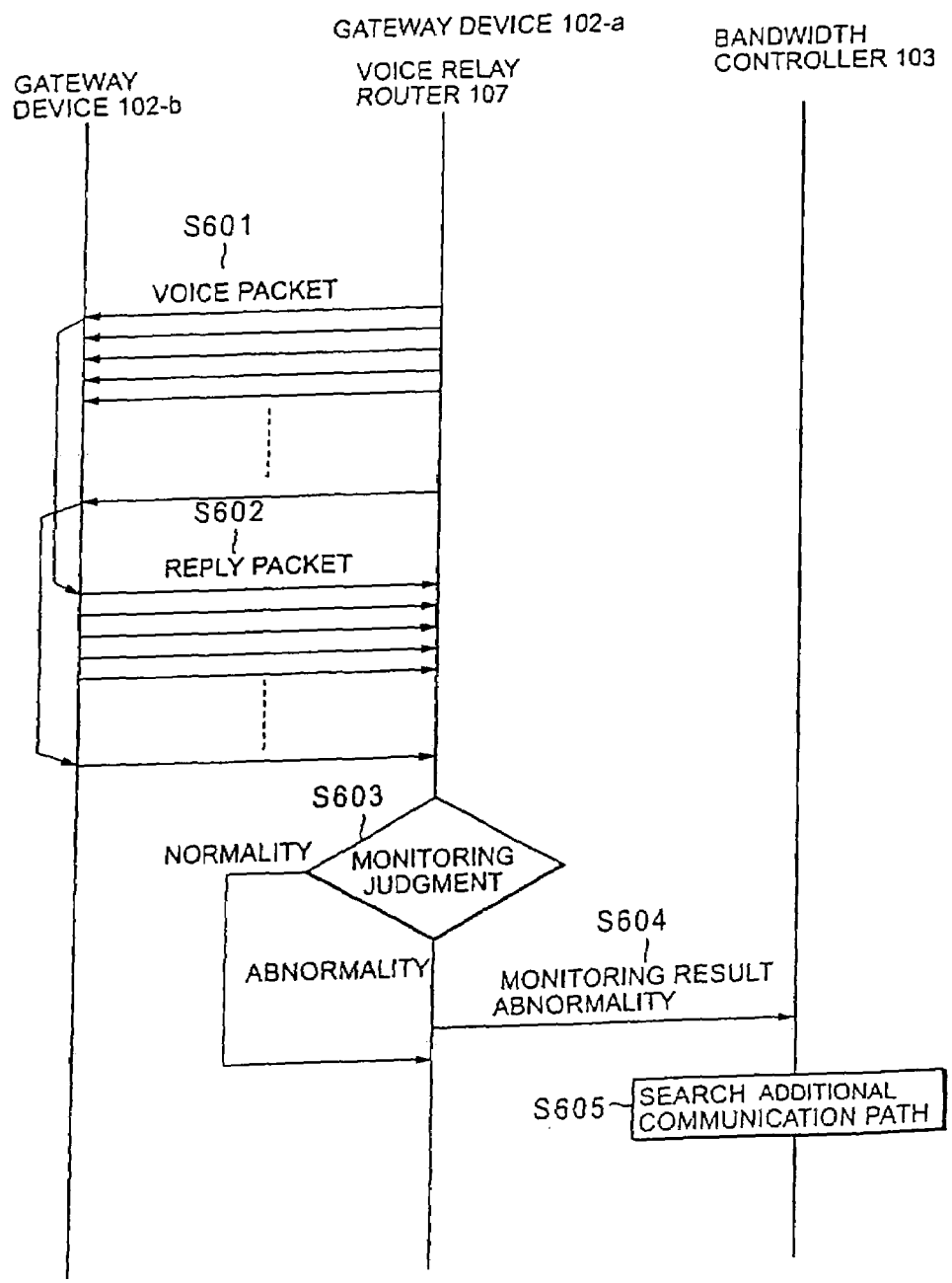
FIG. 13 is a sequence diagram showing a periodic monitoring procedure of a communication path during communication bandwidth reservation in the present invention.

FIG. 13 is a sequence diagram showing the periodic monitoring procedure of a communication path for which the communication bandwidth reservation is made. Specifically, FIG. 13 shows a monitoring test procedure of communication paths (112-c, 112-e) for the gateway device (102-a) and the voice relay router (107) in a case where the communication bandwidth between the gateway device (102-a) and the gateway device (102-b) and between the voice relay router (107) and the gateway device (102-b) is reserved. The gateway device (102-a) and the voice relay router (107) transmit a predetermined number of monitoring voice packets to the gateway device (102-b) at a fixed interval (S601). The gateway device (102-b) returns the voice packet as a reply packet (S602). The gateway device (102-a) and the voice relay router (107) analyzes the packet arrival rate, the transmission delay and the variance of delay on the basis of the transmitted/received packet to judge "normality" or "abnormality" (S603). If the judgment result indicates "abnormality", the abnormality of the monitoring result is notified to the bandwidth controller (103) (S604). The bandwidth controller (103) receiving the notification indicating the abnormality of the monitoring result, an additional communication path which substitutes for the communication path under reservation is searched for (S605). On the other hand, if the monitoring judgment result indicates "normality", the monitoring test is carried out again after a fixed time elapses. This monitoring procedure is carried out independently of a refresh procedure to check the bandwidth reservation condition in the RSVP procedure.

FIG. 14 is a flowchart showing the internal processing in the gateway device and the voice relay router for the periodic monitoring operation of the communication path during bandwidth reservation in the present invention. Specifically, FIG. 14 shows a reserved bandwidth monitoring function of the gateway device (102-a) and the voice relay router (107). Here, for the gateway device (102-a) and the voice relay router (107), a communication bandwidth with the gateway device (102-b) is assumed to be reserved.

The gateway device (102-a) or the voice relay router (107) transmits a voice packet for monitoring quality to the counterpart gateway device (102-b) every fixed time after a bandwidth is reserved therefor (S701). Thereafter, the gateway device (102-a) or the voice relay router (107) receives a reply packet to the monitoring voice packet from the counterpart gateway device (102-b), and then buffers the reply packet into a reception buffer (S702). At this time, each of the voice packet and the reply packet to be transmitted/received for the monitoring is provided with a sequence number and a timestamp for the transmission time, and they are transmitted under the condition that they are returned from the counterpart device as in the case of the Ping procedure provided by IETF, for example.

Subsequently, the ratio of the number of transmission packets and the number of reception packets is calculated, and then the average transmission probability of a going-and-returning route of a reserved bandwidth is calculated (S703). Subsequently, the average transmission probability is subjected to judgment (S704). If the average transmission probability is out of a preset permissible range, this reserved bandwidth is judged not to satisfy the criterion for the communication quality of voice, and the monitoring result is judged as "abnormality" (S710). On the other hand, if the average transmission probability is within the permissible range, then the sum of the differences between the timestamps of the voice packets transmitted and the timestamps of the corresponding reply packets on the reception buffer is calculated, and then the sum is divided by the number of samples to calculate the average transmission delay of the going-and-returning route of the reserved bandwidth (S705). Subsequently, the average transmission delay is subjected to judgment (S706). If the average transmission delay is out of a predetermined permissible range, this reserved bandwidth is judged not to satisfy the criterion for the voice communication quality, and the monitoring result is judged as "abnormality" (S710). On the other hand, if the average transmission delay is within the predetermined range, then variance of delay is calculated from the transmission timestamp, the reception timestamp and the average transmission delay (S707). Thereafter, the variance of delay is subjected to judgment (S708). If the variance of delay is out of a predetermined permissible range, this reserved bandwidth is judged not to satisfy the criterion for the voice communication quality, and the monitoring result is judged as "abnormality" (S710). On the other hand, if the variance of delay is within the permissible value, the reserved bandwidth is judged to satisfy the voice communication quality criterion, and the monitoring result is judged as "normal" (S709).

The optimum value must be selected as each reference value used in the above procedure in consideration of the conditions of the network, and for example, the reference value may be set as follows. 800 ms may be set as the reference value of the average transmission delay in the going-and-returning route on the basis of the delay limit value 400 ms (one way) which is specified not to be generally permitted in the description of ITU-T Recommendation G.114. Further, 81% (going and returning) may be set as the reference value of the average transmission probability in the going-and-returning route on the basis of the limit value of 10% or less (one way) for packet loss which is permissible although voice intermittence is perceived at this level.

(7) Call Setup

Figure 15:
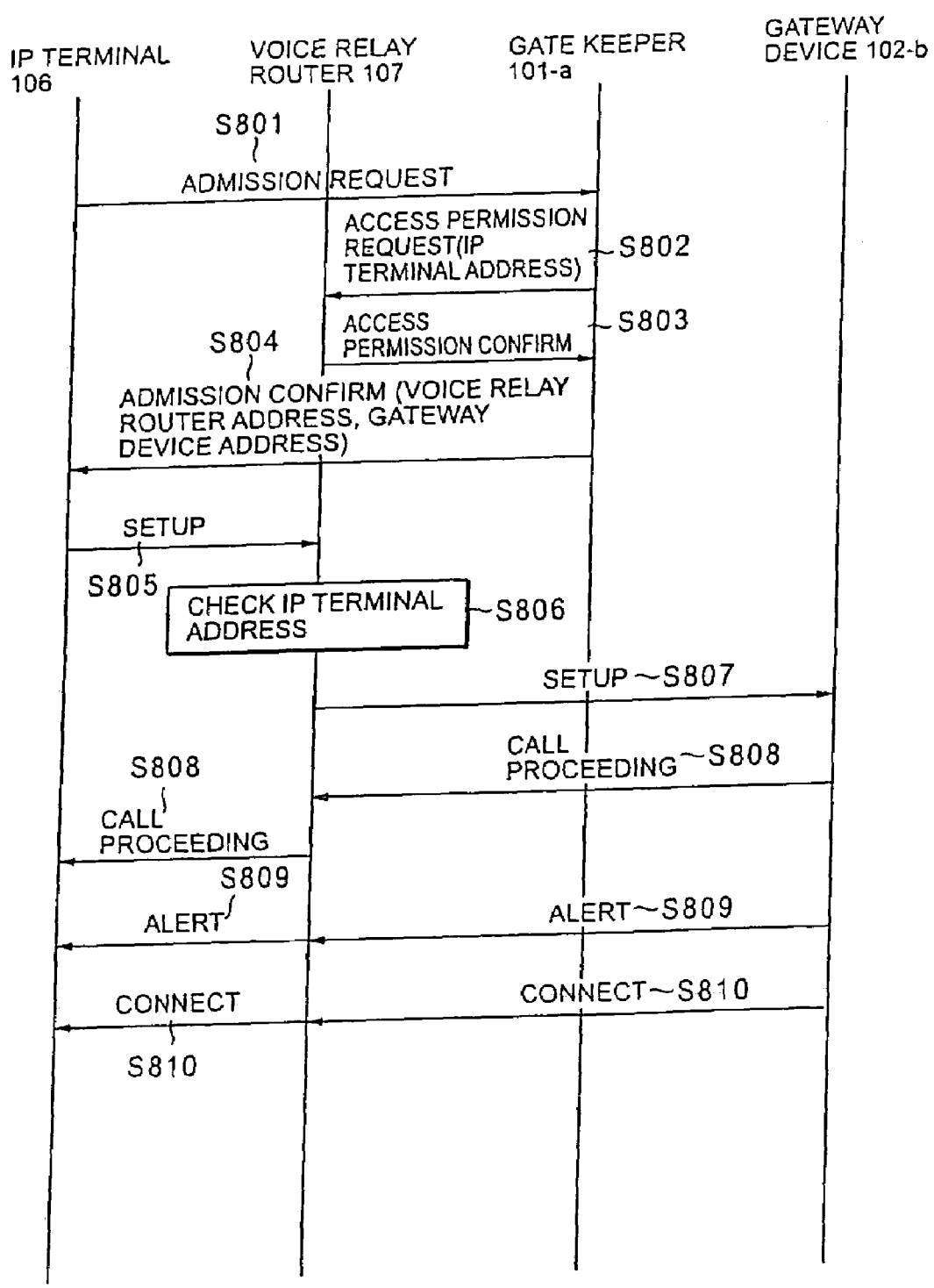
FIG. 15 is a sequence diagram showing a call setup procedure for setting up from an IP terminal to a PSTN terminal when a communication bandwidth is reserved.

FIG. 15 is a sequence diagram showing a call setup procedure when an IP terminal sets up a call to a PSTN terminal under the condition that the communication bandwidth is reserved in the present invention. Specifically, FIG. 15 shows a call setup procedure when the IP terminal (106) sets up a call to the PSTN terminal (105-*b*) under the condition that the communication bandwidth is reserved between the voice relay router (107) and the gateway device (102-*b*). In this case, the telephone network terminal (105-*b*) is assumed to be a terminal permitted by the gateway device (102-*b*).

As an address inquiry procedure, the IP terminal (106) inquires about the address of a called side device via an optimum route to the gate keeper (101-*a*) by using a control signal path (111-*d*) (S801). The gate keeper (101-*a*) refers to the reservation condition table, and on the basis of the calling address and the called number, it preferentially selects, as the optimum route, a communication path (112-*e*) passing the voice relay router (107) and the gateway device (102-*b*) for which the communication bandwidth is reserved, and transmits an access permission signal containing the address of the IP terminal (106) to the voice relay router (107) by using the control signal path (111-*d*) (S802). The voice relay router (107) transmits an access permission reply to the gate keeper (101-*a*) (S803). The gate keeper (101-*a*) receiving the access permission reply transmits an address reply signal containing the address of the voice relay router (107) and the address of the gateway device (102-*b*) to the IP terminal (106) (S804).

Next, the IP terminal (106) notifies the notified address of the called side gateway device (102-*b*) to the voice relay router (107) by using a control path signal (111-*k*) to request a call setup (S805). The voice relay router (107) checks the address of the IP terminal (106) (S806), and when it is coincident with the address to which the access is previously permitted by the gate keeper (101-*a*), the voice relay router (107) requests a call setup using the communication bandwidth reserved to the called gateway device (102-*b*) by using a control signal path (111-*l*) (S807). Subsequently, the gateway device (102-*b*) transmits a call proceeding message (S808), an alerting message (S809) and a connect message (S810) to the IP terminal (106) through the voice relay router (107), thereby establishing the call.

FIG. 16 is a flowchart showing the internal processing of the gate keeper when the call is set up in the present invention. Upon receiving the address inquiry signal from the calling side device, the gate keeper (101) extracts the calling address and the called number from the signal thus received (S901), and then the gate keeper (101) extracts information of the gateway device (102-*b*) at the call destination side from the attribute management table (1605) of the gate keeper (101) on the basis of the extracted called number (S902), and also extracts the calling device information on the basis of the address of the extracted calling address to judge whether the calling side device is the IP terminal (106) (S903). If the calling side device is judged to be the IP terminal (106), the address of the voice relay router (107) is extracted from the attribute management table (1605) (S904), and an access permission signal added with the calling address is transmitted to the voice relay router (107) concerned (S905). Thereafter, upon receiving the reply signal from the voice relay router (107), an address reply signal added with the information on the address of the voice relay router (107) and the address of the gateway device (102-*b*) at the call destination is transmitted to the call source IP terminal (106) (S906). When the device of the calling address is the gateway device (102-*a*), the gate keeper (101) transmits an address reply signal added with address information of the gateway device (102-*b*) of the call destination to the call source gateway device (102-*a*) (S906), thereby completing the call processing of the gate keeper (101).

Figure 17:
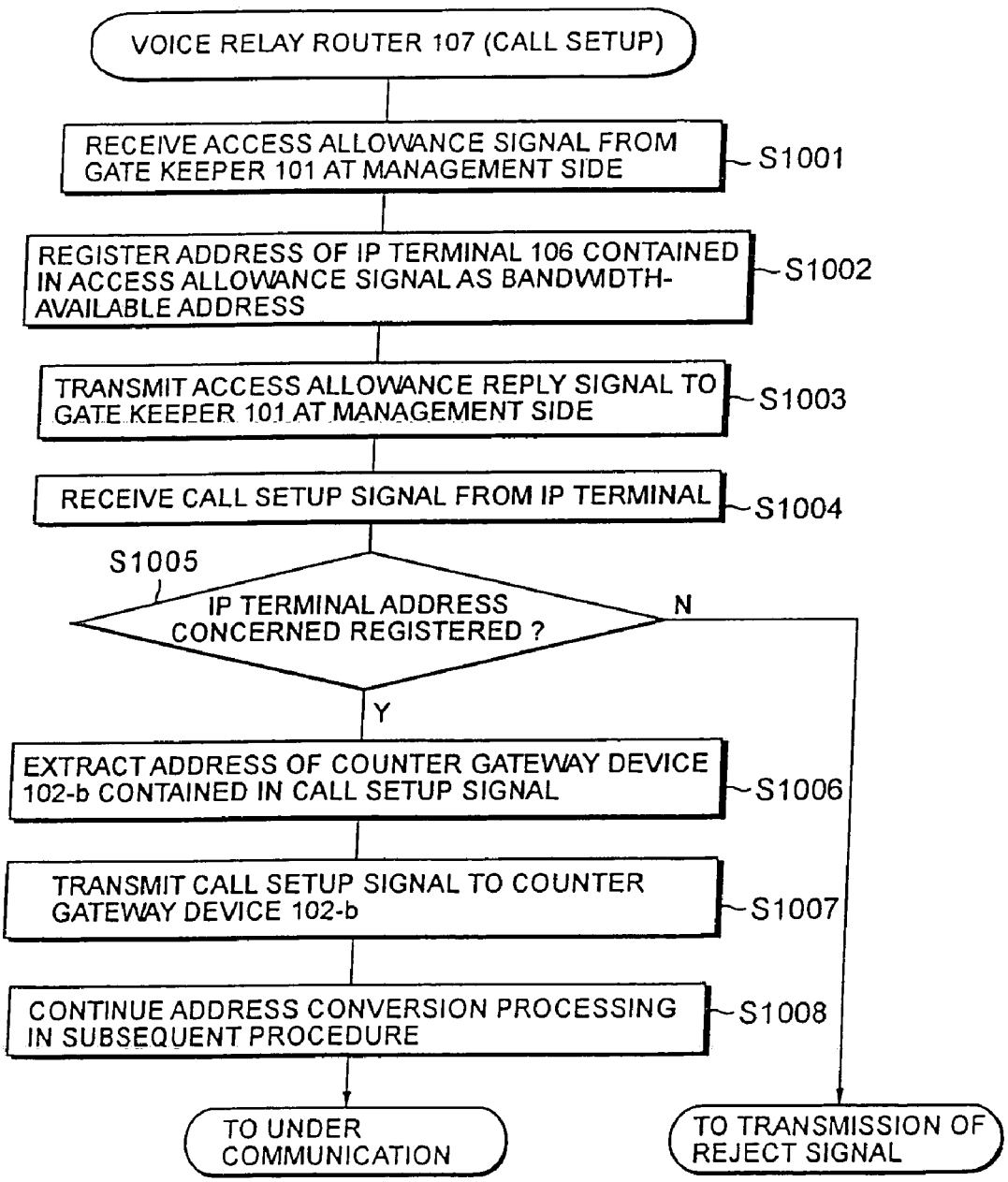
FIG. 17 is a flowchart showing the processing in the voice relay router for the call setup when a communication bandwidth is reserved.

FIG. 17 is a flowchart showing the internal processing of the voice relay router at the call setup time when the communication bandwidth is reserved.

Upon receiving the access permission signal from the gate keeper (101) at the management side (S1001), the voice relay router (107) registers the address of the IP terminal (106) contained in the access permission signal into the storage device of its own device (S1002), and transmits an access permission reply signal to the gate keeper (101) at the management side (S1003). The gate keeper (101) at the management side which receives the access permission reply signal transmits an address reply signal to the IP terminal (106) concerned. The IP terminal (106) receiving the address reply signal transmits a call setup signal to the voice relay router (107). The voice relay router (107) receiving the call setup signal (S1004) judges whether the calling address contained in the call setup signal has been registered as a bandwidth-available address (S1005). If the calling address is judged to be unregistered, it is regarded as an access from an IP terminal (106) having no bandwidth-available permission, and a reject signal is transmitted. On the other hand, if the calling address is judged to be registered, the address of the counterpart gateway device (102-*b*) contained in the call setup signal is extracted (S1006), and a call setup signal is transmitted to the counterpart gateway device (102-*b*) (S1007). In the subsequent call setup procedure, the address conversion is continued (S1008), and the processing is shifted to a state under communication.

(8) Problem

Figure 18:
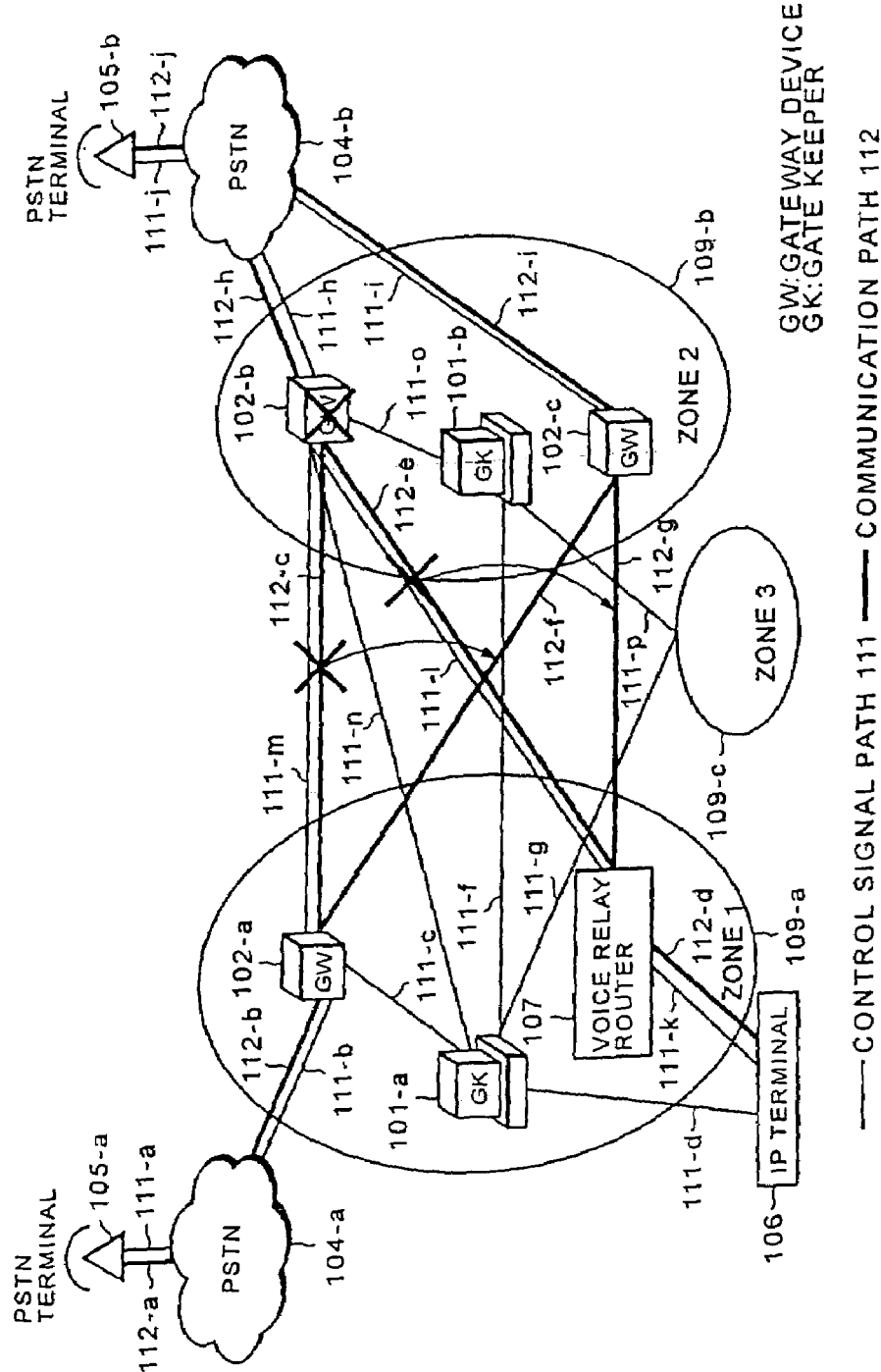

FIG. 18 is a diagram showing the construction of a system for providing internet telephone services when a device in the Internet is unavailable due to a problem or the like in the present invention. Specifically, FIG. 18 shows a system construction for countermeasures against the occurrence of some problem in the Internet or detection of incorrectness of attribute information when a call occurs. The gate keeper (101-*a*) is assumed to manage the zone 1 (109-*a*) to which the voice relay router (107) and the gateway device (102-*a*) belongs, and the gate keeper (101-*b*) is assumed to manage the zone 2 (109-*b*) to which the gateway device (102-*b*) and the gateway device (102-*c*) belongs. Further, a plurality of gate keepers (101) for managing respective zones (109) exist. Some route may pass through a plurality of routing nodes (e.g., routers).

When a call is initiated from the PSTN (105-*a*) or the IP terminal (106) to the PSTN terminal (105-*b*), the gate keeper (101-*a*) refers to the database in its own device to select a gateway device (102-*b*) at the call destination side according to a proper gateway device selection logic. When the gateway device (102-*b*) is in a congested state, in a device problem state or in a data invalid state and thus it is unavailable, the gate keeper (101-*a*) receiving a notification representing the above status of the gateway device (102-*b*) selects another communication path settable gateway device (102-*c*) according to the gateway device selection logic. As a result, the PSTN terminal (105-*a*) or the IP terminal (106) can connect a call to the destination PSTN terminal (105-*b*) through new routes (112-*f*, 112-*g*, 112-I) passing through the gateway device (102-*c*) which can make communications.

Figure 19:
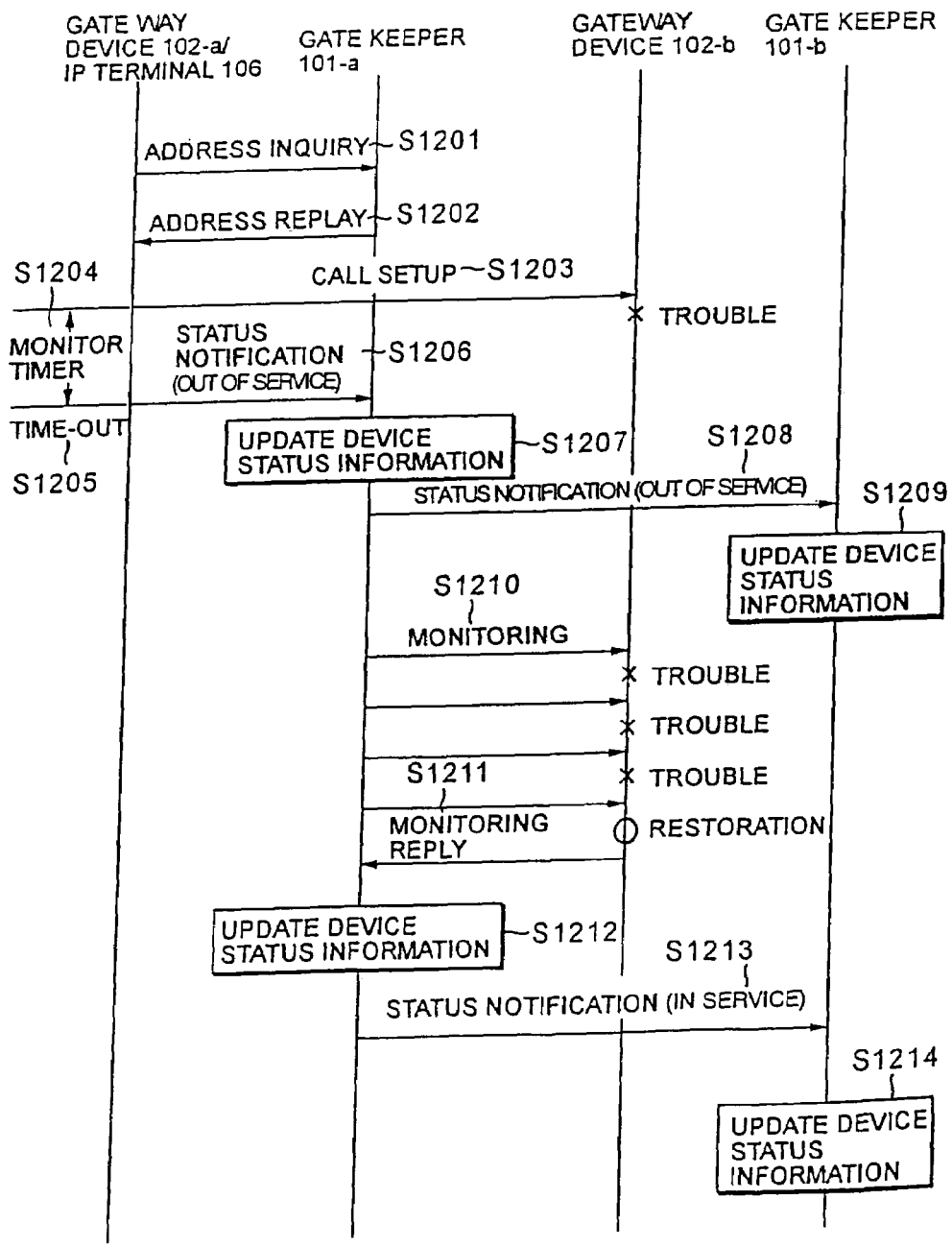
FIG. 19 is a sequence diagram showing a procedure of detecting a problem of a gateway device and restoring from the problem.

FIG. 19 is a sequence diagram showing the procedure of problem detection and trouble restoration of the gateway device in the present invention. Specifically, FIG. 19 shows a problem monitoring procedure when a problem of a called side gateway device (102-*b*) is detected at the call setup time of a terminal. The gateway device (102-*a*) or the IP terminal (106) notifies the telephone number of the call destination and attribute information necessary for the connection to the calling side gate keeper (101-*a*) by using the control signal paths (111-*c*, 111-*d*), and inquires about the address of the device at the call destination side (S1201). The calling side gate keeper (101-*a*) searches for a gateway device (102-*b*) which satisfies the condition, and returns an address reply while adding the address concerned to the address reply (S1202). The gateway device (102-*a*) or the IP terminal (106) transmits a call setup signal to the gateway device (102-*b*) of the received address by using the control signal paths (111-*k*, 111-*l*, 111-*m*) (S1203). When the gateway device (102-*a*) or the IP terminal (106) detects that no call setup reply is transmitted and time is out (S1205) after monitoring the timer for a fixed time (S1204), it regards the gateway device (102-*b*) as being in the problem state, and notifies the state of the gateway device (102-*b*) to the calling side gate keeper (101-*a*) to thereby notify about the problem (S1206). Further, as another case, there may be a case where the call setup is impossible because the called side gateway device (102-*b*) e returns a Release Complete message described in ITU-T H.225.0 to the gateway device (102-*a*) or the IP terminal (106). As the Release Complete Reason parameter at this time may be considered "no Bandwidth", "gateway Resources", "adaptive Busy" or the like which represents that the line of the gateway device (102-*b*) is in a congested state.

The calling side gate keeper (101-*a*) receiving the status notification from the gateway device (102-*a*) or the IP terminal (106) updates to "out of service" the device status information (1604) in the device status management table (1601) of the database according to the status notification (S1207), and also notifies the problem of the gateway device (102-*b*) to the gate keepers (101) of the other zones (109) including the gate keeper (101-*b*) by using control signal paths (111-*f*, 111-*g*, etc.) (S1208). Here, the status notification (S1208) may be made after it is confirmed according to the monitoring procedure as described later that the gateway device (101-*b*) is not restored. Each of the other gate keepers (101-*b*, etc.) receiving the status notification from the calling side gate keeper (101-*a*) updates to "out of service" the device status information (1604) in the device status management table (1601) of each database (S1209). The calling side gate keeper (101-*a*) and the other gate keepers (101-*b*, etc.) do not select the gateway device (102-*b*) in a problem state for each subsequent call setup, whereby services using additional routes (112-*f*, 112-*g*, etc.) having no problem can be provided.

The calling side gate keeper (101-*a*) transmits, every fixed time, a monitoring signal to the gateway device (102-*b*) whose problem state is described in the database (S1210) to monitor whether the problem of the gateway device (102-*b*) is restored or not. When confirming the problem restoration by receiving a monitoring reply signal (S1211), the gate keeper (101-*a*) at the calling side updates the device status information (1604) to "in service" (S1212), and also notifies the "in service" of the gateway device (102-*b*) to the gate keepers (101) of the other zone (109) including the gate keeper (101-*b*) (S1213). The gate keepers (101-*b*, etc.) receiving the status notification from the gate keeper (101-*a*) update the status device information to "in service" (S1214). The gateway device (102-*b*) which is stored as being "in service" in the database is allowed to be selected from the subsequent call setup, whereby the gateway device (102-*b*) can be automatically incorporated into the service. As another method, it may be considered that the called side gateway device (102-*b*) (call destination side) notifies to the gateway device (102-*a*) or the IP terminal (106) the restoration of the congestion state of the gateway device (102-*b*) whose Release Complete Reason parameter has been subject to no Bandwidth, gateway Resources, or adaptive Busy.

Figure 20:
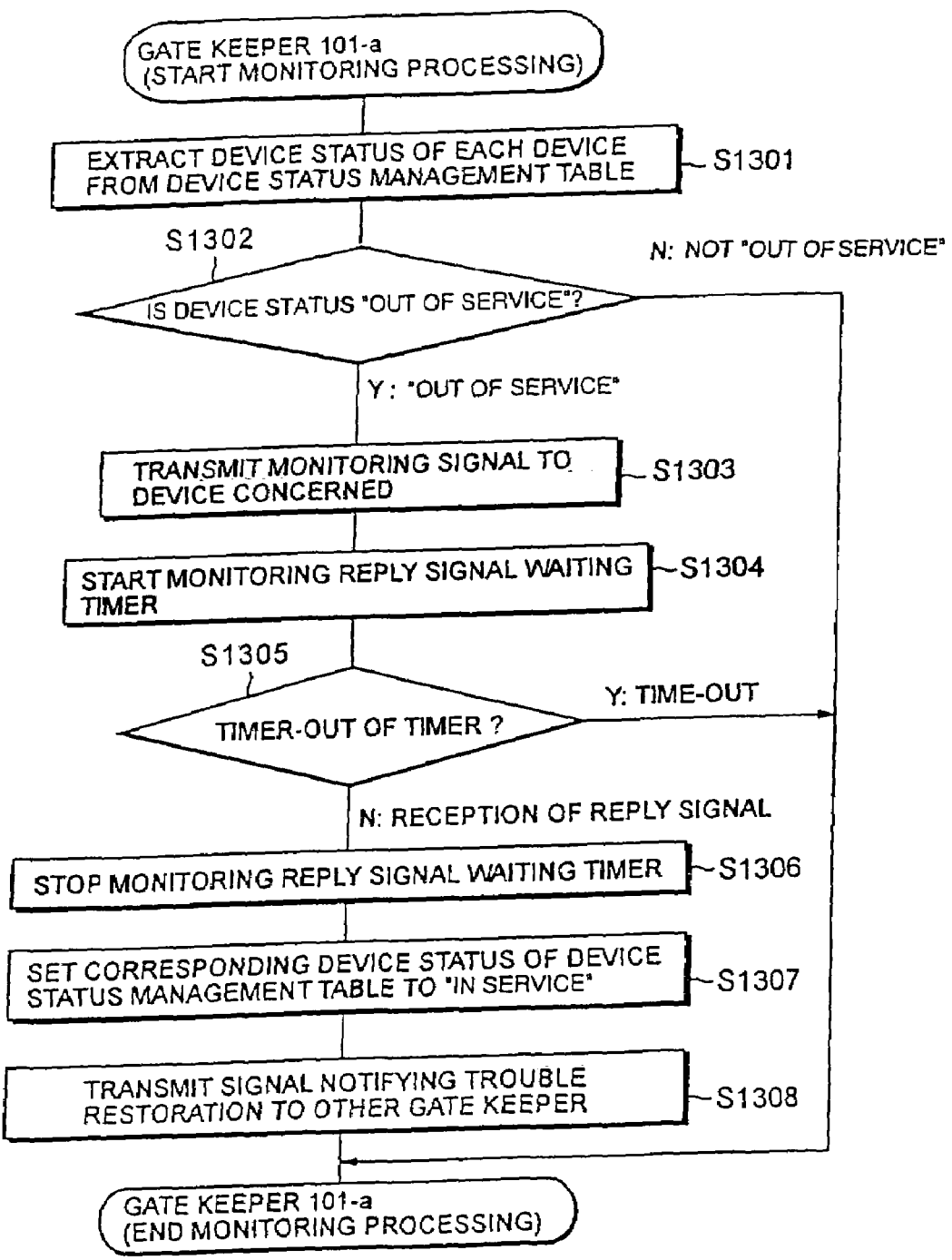
FIG. 20 is a flowchart showing problematic device monitoring processing of the gate keeper.

FIG. 20 is a flowchart showing problem device monitoring processing of the gate keeper according to the present invention.

The gate keeper (101-*a*) extracts the device status information (1604) of the device status management table (1601) at every fixed time (S1301) to judge whether the device status thus extracted is "out or service" (S1302). If the extracted device status is out of the "out of service", the monitoring processing on the device concerned is finished, and it is carried out on another device. On the other hand, if the extracted device status is the "out of service", a monitoring signal is transmitted to the device concerned (S1303) and a reply signal waiting timer is started (S1304). When receiving a reply signal before the time-out of the timer (S1305), the gate keeper (101-*a*) stops the timer (S1306) and sets the corresponding device status information (1604) of the device status management table (1601) to "in service" (S1307). Further, it transmits a signal notifying the problem restoration to the gate keepers (101) of the other zones (109) including the gate keeper (101-*b*) by using the control signal paths (111-*f*, 111-*g*, etc.) (S1308). On the other hand, if the timer expires, the monitoring processing is carried out on the other devices in turn. Here, the period time at which the monitoring processing is started may be set to the optimum value in accordance with the scale of the network and the number of devices. When the "out of service" continues, the frequency of the monitoring procedure having a high failure probability may be reduced by setting the period time to a longer time.

(9) Incorrectness of End-End Attribute Information

Figure 21:
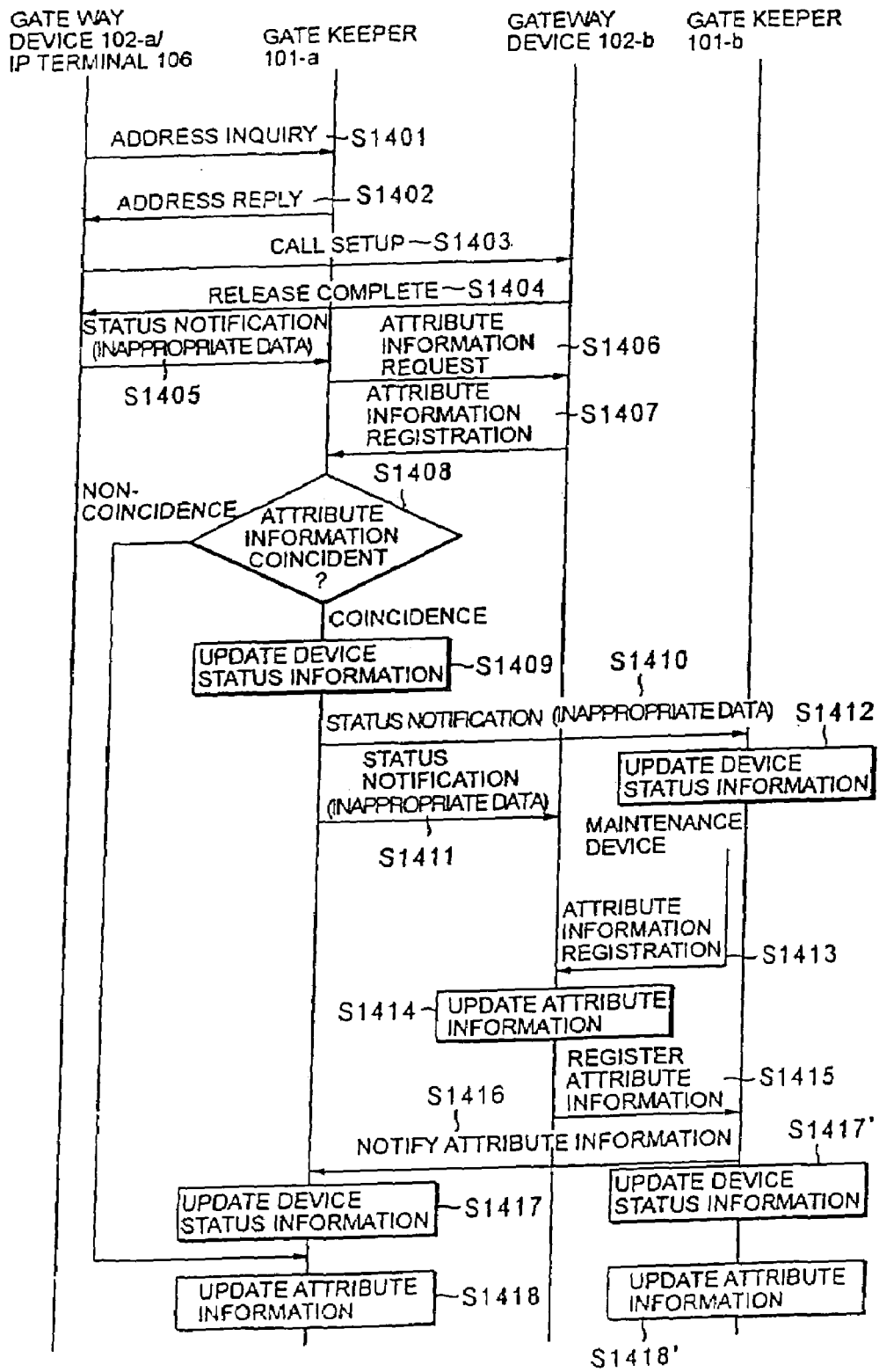
FIG. 21 is a sequence diagram showing a procedure of detecting incorrectness of end-end attribute information of a gateway device and restoring the invalid state to the normal state.

FIG. 21 is a sequence diagram showing the procedure of detecting and restoring incorrectness of end-end attribute information of the gateway device according to the present invention. Specifically, FIG. 21 shows the attribute information management procedure when incorrectness of end-end attribute information of the called side gateway device (102-*b*) at the call setup time of the terminal. As in the case of FIG. 19, the gateway device (102-*a*) or the IP terminal (106) notifies end-end attribute information such as a call-destination telephone number, a communication protocol condition, etc. to the gate keeper (101-*a*) to determine a gateway device (102-*b*) meeting the conditions (S1401, S1402) and transmits a call-setup signal to the gateway device (102-*b*) (S1403).

Here, when it is impossible for the gateway device (102-*b*) at the call destination side to completely perform the requested setting, it returns a release complete message containing reason information (release information) on the connection impossibility (S1404). The gateway device (102-*a*) or the IP terminal (106) judges the reason information, and if the reason information indicates the incorrectness of the end-end attribute information, it notifies the data invalid state and the invalid content to the gate keeper (101-*a*) managing the zone 1 (109-*a*) by transmitting the status notification (S1405). The incorrectness of the end-end attribute information may be judged on the basis of a Release Complete Reason parameter or the like described in ITU-T H.225.0 or the like. For example, it may be defined that it is caused by the prefix information of permitted telephone numbers if the parameter value is "unreachable Destination" and by non-coincidence of signal protocol information if the parameter value is "no Permission".

The gate keeper (101-*a*) requests a re-notification of the attribute information to the gateway device (102-*b*) (S1406). The gateway device (102-*b*) receiving this request re-notifies the attribute information to the gate keeper (101-*a*) (S1407). The gate keeper (101-*a*) compares with the attribute information received with the attribute information in the database (S1408). If they are not coincident with each other, the gate keeper (101-*a*) judges that the cause is a writing error in the original attribute information registration operation, an omission of attribute registration or the like, and updates the attribute information in the database (S1418). If the comparison is "coincidence", the gate keeper (101-*a*) judges that the end-end attribute information stored in the gateway device (102-*b*) is invalid or there is an abnormality in the attribute information notifying means from the gateway device (102-*b*), and updates the device status information (1604) in the device status management table (1601) of the database to "inappropriate data" (S1409). Further, the gate keeper (101-*a*) notifies "inappropriate data" of the gateway device (102-*b*) to the gate keepers (101) of the other zones (109) including the gate keeper (101-*b*) by using the control signal paths (111-*f,* 1110-*g,* etc.) (S1410), and at the same time it notifies "inappropriate data" through a control signal path (111-*n*) to the gateway device (102-*b*) whose end-end attribute information is invalid (S1411).

The gate keeper (101-*b*) receiving the status notification from the gate keeper (101-*a*) updates the device status information (1604) in the database to "inappropriate data" (S1412). The gateway device (102-*b*) in the problem state which is stored in the database is prohibited from being selected at a subsequent call setup time, whereby the gateway device (102-*b*) having invalid end-end attribute information can be avoided from being used in the overall network. Here, in order to facilitate the comparison between old and new attribute information, version or date/hour information may be contained in each attribute information.

When new attribute information on the gateway device (102-*b*) is registered by a maintenance device (S1413), the gateway device (102-*b*) updates the attribute information of the attribute management table (1605) (S1414) and then registers the attribute information into the gate keeper (101-*b*) managing the zone 2 (109-*b*) (S1415). The gate keeper (101-*b*) notifies the attribute information to the gate keepers (101) of the other zones (109) including the gate keeper (101-*a*) by using control signal paths (111-*f,* 111-*p,* etc.) (S1416). Each gate keeper (101) regards the newly-notified attribute as normal attribute information, updates the device status information (1604) of the internal database to "in service" (S1417') and updates the attribute information of the attribute management table (1605) in the database (S1418'). The gateway device (102-*b*), the attribute information of the database for which is improved, is allowed to be selected as a connect target from a subsequent all setup, whereby the gateway device (102-*b*) is automatically incorporated in the network.

According to the present invention, as a first effect, for example, a communication bandwidth of fixed quality which is matched in traffic characteristic with a called (call destination) side gateway device is secured in the internet telephone, whereby a high-reliability and flexible bandwidth management system can be implemented in the overall network. Further, according to the present invention, as a second effect, a connectability problem to a gateway device is detected to exclude the gateway device having the problem and select the optimum gateway device, whereby a high-reliability gateway device management system can be implemented. Still further, as a third effect, when erroneous end-end attribute information on a gateway device is detected, selection logic for prohibiting the gateway device concerned from being selected until it is restored is established, thereby implementing an attribute information management system for supplying sturdy internet telephone services.

What is claimed is:

1. An Internet telephone connection method for use on the Internet comprising plural zones, which includes gateway devices each for mutually connecting a PSTN (public switch telephone network) and the Internet, gate keepers each provided for each zone and each for managing the gateway devices in a corresponding zone, and a bandwidth controller for managing the gate keeper in each zone, wherein:

each of said gate keepers have a device status managing table in which status information of the gateway device in the corresponding zone as well as the status information of gateway devices managed by other gate keepers in other zones are registered;

said bandwidth controller has a bandwidth reservation schedule table in which communication bandwidth and two gateway devices using this communication bandwidth for communication are registered with a reservation time zone, so as to determine a communication bandwidth to be reserved and two gateway devices communicating with each other using this communication bandwidth, according to said bandwidth reservation schedule table and information obtained from said device status managing table, said bandwidth controller configured to transmit a bandwidth reservation request for the communication bandwidth thus determined to the two gateway devices thus determined; and each of said gateway devices reserves the communication bandwidth with a counterpart gateway device according to the bandwidth reservation request, wherein:

when call request is made from a calling side PSTN terminal in a PSTN to a called side PSTN terminal in another PSTN, a calling side gateway device which is connected to the PSTN at the calling side notifies the telephone number of a call destination to said gate keeper managing the calling side gateway device to determine the corresponding called side gateway device, and the calling side and called side PSTNs are connected via the Internet by using the communication bandwidth reserved between the calling side gateway device and the called side gateway device, thereby connecting the calling side PSTN terminal to the called side PSTN terminal.

2. The Internet telephone connection method as claimed in claim 1, wherein: when the connection to said gateway device notified from said gate keeper fails due to some problem, congestion or the like, said calling side gateway device notifies to said calling side gate keeper that some problem occurs with respect to connectability to said called side gateway device, and said calling side gate keeper determines another connectable gateway device when receiving from said calling said gateway device the notification indication the failure of the connection to said called side gateway device, and registers the status of said called side gateway device as a problem state in the device status managing table, and also notifies the problem state to the other gate keepers.

3. The gate keeper used in the Internet telephone connection method as claimed in claim 1, wherein:

said gate keeper carries out a test of checking connectability for said called gateway device indicated as "out of service" in the device status managing table of said gate keeper while the "out of service" continues, and alters the device status of said gateway device to "in service" in the device status managing table thereof when the problem is restored while notifying the "in service" to the other gate keepers.

4. The gate keeper used in the Internet telephone connection method as claimed in claim 1, wherein:

when the connection cannot be established as requested, said gate keeper requests said called side gateway device to notify the attribute information, and compares the attribute information notified from said called side gateway device with the attribute information of said called side gateway device registered in an attribute management table, and when comparison result shows erroneous of the attribute information, said gate keeper sets the device status of said called side gateway device to "inappropriate data" in the device status managing table, excludes said gateway device concerned from selection targets and notifies the "inappropriate data" to the other gate keepers.

5. An Internet telephone connection method for use in the Internet comprising plural zones, which includes gateway devices each for mutually connecting a PSTN (public switch telephone network) and the Internet, voice relay routers each for relaying and transferring voice, gate keepers each provided for each zone and each for managing the gateway devices and the voice relay routers in a corresponding zone, and a bandwidth controller for managing the gate keeper in each zone, wherein:

each of said gate keepers have a device status managing table in which status information of the gateway device and the voice relay router in the corresponding zone as well as the status information of gateway devices and the voice relay routers managed by other gate keepers in other zones are registered;

said bandwidth controller has a bandwidth reservation schedule table in which in a first mode of operation a communication bandwidth and two gateway devices and in a second mode of operation a gateway device and a voice relay router using this communication bandwidth for communication are registered with a reservation time zone, said bandwidth controller determining a communication bandwidth to be reserved and said two gateway devices to be used in said first mode of operation and said bandwidth controller determining a gateway device and a voice relay router communicating with each other using this communication bandwidth in said second mode of operation, according to said bandwidth reservation schedule table and information obtained from the device status managing table, said bandwidth controller further configured to transmit a bandwidth reservation request for the communication bandwidth thus determined to the two gateway devices in the first mode of operation and further transmit a bandwidth reservation request for the communication bandwidth to the gateway device and the voice relay router thus determined in said second mode of operation; and said gateway device reserves the communication bandwidth with a counterpart gateway device according to the bandwidth reservation request, wherein:

when a call request is made from a calling side PSTN terminal in a PSTN to a called side PSTN terminal is another PSTN, a calling side gateway device which is connected to the PSTN at the calling side notifies the telephone number of a call destination to said gate keeper managing the gateway device to determine the corresponding called side gateway device, and the calling side and called side PSTNs are connected via the Internet by using the communication bandwidth reserved between the calling side gateway device and the called side gateway device, thereby connecting the calling side PSTN terminal to the called side PSTN terminal.

6. The Internet telephone connection method as claimed in claim 5, further including IP terminals which are connected to the Internet to perform voice communications, wherein:

when a call request is made from a calling side IP terminal to a called side PSTN terminal in a PSTN connected to the Internet, said calling side IP terminal notifies the telephone number of the call destination to said gate keeper to determine the corresponding called side gateway device and a calling side voice relay router connected to said calling side IP terminal, and said calling side IP terminal and said called side PSTN are connected via the Internet by using the communication bandwidth reserved between said calling side voice relay router and the called side gateway device, thereby connecting said calling IP terminal to said called terminal.

7. The Internet telephone connection method as claimed in claim 5, wherein:

when the communication bandwidth is reserved, said gateway device or said voice relay router measures communication quality such as packet transmission probability, transmission delay and variance of delay every fixed time with a counterpart gateway device or a voice relay router, and notifies a monitoring result abnormality to said bandwidth controller if the measured communication quality is out of a predetermined range, and when the monitoring result abnormality is notified from said gateway device or said voice relay router to said bandwidth controller, said bandwidth controller searches an additional communication path, and transmits a reservation content altering request either the gateway device or another gateway device to reserve a communication bandwidth for the additional communication path.

8. An Internet telephone connection method for use in the Internet comprising plural zones, which includes gateway devices each for mutually connecting a PSTN (public switched telephone network) and the Internet, gate keepers each provided for each zone and each for managing the gateway devices in a corresponding zone, and a bandwidth controller for managing the gate keeper in each zone, wherein:

each of said gate keepers have a device status managing table in which status information of the gateway device in the corresponding zone as well as the status information of gateway devices managed by other gate keepers in other zones are registered, and wherein:

when, for each of said gateway devices, a communication bandwidth is reserved, said gateway device measures communication quality such as packet transmission probability, transmission delay and variance of delay every fixed time with a counterpart gateway device, and notifies a monitoring result abnormality in said communication quality to said bandwidth controller and registers the status of said counterpart gateway device as a problem state in the device status managing table, if the measured communication quality is out of a predetermined range, and when receiving the monitoring result abnormality from said gateway device, said bandwidth controller searches for an additional communication path, and instructs either the gateway device or another gateway device to reserve a communication bandwidth of the additional communication path.

9. An internet telephone connection method for use with the Internet comprising plural zones, which includes gateway devices each for mutually connecting a PSTN (public switched telephone network) and the Internet, voice relay routers each for relaying and transferring voices, gate keepers each provided for each zone and each for managing the gateway devices and the voice relay routers in a corresponding zone, and a bandwidth controller for managing the gate keeper in each zone, wherein:

each of said gate keepers have a device status managing table in which status information of the gateway device and the voice relay router in the corresponding zone as well as the status information of gateway devices and the voice relay routers managed by other gate keepers in other zones are registered, and wherein:

when, for each of said gateway devices, a communications bandwidth is reserved, said voice relay router measure communication quality such as packet transmission probability, transmission delay and variance of delay, every fixed time with a counterpart gateway device or voice relay router, and notifies a monitoring result abnormality in said communication quality to said bandwidth controller if the measured communication quality is out of a predetermined range, and when the monitoring result abnormality is notified from said voice relay router to said bandwidth controller, said bandwidth controller searches for an additional communication path, and instructs either the gateway device or another gateway device to reserve a communication bandwidth for the additional communication path.

10. A bandwidth controller for use in an Internet telephone system having gateway devices each for mutually connecting a PSTN (public switched telephone network) and the Internet comprising plural zones, voice relay routers each for relaying and transferring speech, and gate keepers each provided for each zone and each for managing said gateway devices and said voice relay routers in a corresponding zone, including:

a status managing means which stores status information of a gateway device in the corresponding zone as well as the status information of gateway devices managed by other gate keepers in other zones, storage means including a bandwidth reservation condition table for storing a communication bandwidth which is secured through bandwidth reservation processing, and a bandwidth reservation schedule table for storing a condition for starting the bandwidth reservation processing;

means for instructing each gateway device to reserve a communication bandwidth with a counterpart gateway device or voice relay router, cancel the reservation or alter the reservation content, according to the bandwidth reservation condition table and the bandwidth reservation schedule table; and means for searching an additional communication path when a monitoring result abnormality is notified from said gateway device or said voice relay router, and instructing another gateway device to reserve a communication bandwidth of the additional communication path, thereby managing said gate keeper in each zone.

11. An Internet telephone connection method for use on the Internet comprising plural zones, which includes gateway devices each for mutually connecting a PSTN (public switch telephone network) and the Internet, gate keepers each provided for each zone and each for managing the gateway devices in a corresponding zone, and a bandwidth controller for managing the gate keeper in each zone, wherein:

each of said gate keepers have a device status managing table in which status information of the gateway device in the corresponding zone as well as the status information of gateway devices managed by other gate keepers in other zones are registered;

each of said gate keepers further having a bandwidth reservation schedule table in which communication bandwidth and two gateway devices using this communication bandwidth for communication are registered with a reservation time zone, wherein information stored in said bandwidth reservation schedule table is provided to said bandwidth controller;

said bandwidth controller determines communication bandwidth to be reserved and two gateway devices communicating with each other using this communication bandwidth, according to said bandwidth reservation schedule table and information obtained from said device status managing table, said bandwidth controller is further configured to transmit a bandwidth reservation request for the communication bandwidth thus determined to the two gateway devices thus determined; and each of said gateway devices reserves the communication bandwidth with a counterpart gateway device according to the bandwidth reservation request, wherein:

when call request is made from a calling side PSTN terminal in a PSTN to a called side PSTN terminal in another PSTN, a calling side gateway device which is connected to the PSTN at the calling side notifies the telephone number of a call destination to said gate keeper managing the calling side gateway device to determine the corresponding called side gateway device, and the calling side and called side PSTNs are connected via the Internet by using the communication bandwidth reserved between the calling side gateway device and the called side gateway device, thereby connecting the calling side PSTN terminal to the called side PSTN terminal.

* * * * *